US009151923B2

(12) United States Patent
Nielson et al.

(10) Patent No.: US 9,151,923 B2
(45) Date of Patent: Oct. 6, 2015

(54) METHODS OF CONNECTORIZING MULTI-CORE FIBER OPTIC CABLES AND RELATED APPARATUS

(71) Applicant: CommScope, Inc. of North Carolina, Hickory, NC (US)

(72) Inventors: Jeffrey D. Nielson, Longmont, CO (US); Richard L. Case, Omaha, NE (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 14/172,996

(22) Filed: Feb. 5, 2014

(65) Prior Publication Data

US 2014/0219609 A1    Aug. 7, 2014

Related U.S. Application Data

(60) Provisional application No. 61/760,672, filed on Feb. 5, 2013.

(51) Int. Cl.
*G02B 6/40* (2006.01)
*G02B 6/46* (2006.01)
*G02B 6/38* (2006.01)
*G02B 6/02* (2006.01)

(52) U.S. Cl.
CPC ............... *G02B 6/46* (2013.01); *G02B 6/3851* (2013.01); *G02B 6/02042* (2013.01); *G02B 6/3885* (2013.01); *G02B 6/3887* (2013.01); *Y10T 29/49826* (2015.01)

(58) Field of Classification Search
CPC .......... G02B 6/381; G02B 6/46; G02B 6/403; G02B 6/3385; G02B 6/3825
USPC .............. 385/54, 58–60, 70–74; 29/428
See application file for complete search history.

(56) References Cited

U.S. PATENT DOCUMENTS

| | | | |
|---|---|---|---|
| 5,734,773 A | 3/1998 | Teshima et al. | |
| 6,154,594 A | 11/2000 | Fiacco et al. | |
| 6,721,467 B2 * | 4/2004 | Olson | 385/11 |
| 7,082,242 B2 * | 7/2006 | Fajardo et al. | 385/127 |
| 7,184,635 B2 | 2/2007 | Livingston | |
| 7,548,674 B1 | 6/2009 | Horibe et al. | |
| 7,604,417 B2 | 10/2009 | Nielson et al. | |
| 7,625,129 B2 | 12/2009 | Nielson et al. | |

(Continued)

FOREIGN PATENT DOCUMENTS

| | | | |
|---|---|---|---|
| JP | 09184938 A | * | 7/1997 |
| JP | 2003-202473 A | | 7/2003 |

(Continued)

*Primary Examiner* — Ellen Kim

(74) *Attorney, Agent, or Firm* — Muncy, Geissler, Olds & Lowe, P.C.

(57) ABSTRACT

A connector with at least one multi-core fiber (MCF) and method of attaching the MCF within the connector, includes inserting a first end of a MCF into a ferrule of a connector. Then, rotating the end of the MCF within the ferrule until a first selected satellite core of the MCF is in a first alignment relative to a feature of the connector. The feature may be a mark, indentation or protrusion formed on a ferrule, ferrule holder or connector envelope. Finally, affixing the MCF within the ferrule of the connector. In the case of an array-type connector, first ends of other MCFs may be added to the ferrule and clocked relative to the same feature of the connector. Second ends of one or more MCFs may be clocked relative to a same feature of a second connector.

20 Claims, 27 Drawing Sheets

(56) References Cited

U.S. PATENT DOCUMENTS

| | | | |
|---|---|---|---|
| 8,038,354 B2 * | 10/2011 | Nielson et al. | 385/59 |
| 8,175,431 B2 | 5/2012 | Imada et al. | |
| 8,529,138 B2 | 9/2013 | Duis et al. | |
| 8,876,403 B2 * | 11/2014 | Katoh | 385/72 |
| 2002/0085815 A1 | 7/2002 | Shinagawa et al. | |
| 2003/0113069 A1 * | 6/2003 | Kim et al. | 385/52 |
| 2004/0189321 A1 | 9/2004 | Drexler et al. | |
| 2005/0220419 A1 * | 10/2005 | Stevens | 385/55 |
| 2011/0229085 A1 | 9/2011 | Bradley et al. | |
| 2011/0229086 A1 | 9/2011 | Bradley et al. | |
| 2011/0274398 A1 | 11/2011 | Fini et al. | |
| 2012/0219254 A1 | 8/2012 | Bradley et al. | |
| 2012/0219255 A1 | 8/2012 | Bradley et al. | |
| 2012/0224808 A1 | 9/2012 | Hayashi et al. | |
| 2012/0328238 A1 * | 12/2012 | Inoue et al. | 385/16 |
| 2013/0058661 A1 * | 3/2013 | Greiss et al. | 398/142 |
| 2013/0163072 A1 | 6/2013 | Chang et al. | |
| 2013/0251320 A1 | 9/2013 | Hayashi | |

FOREIGN PATENT DOCUMENTS

| | | | | |
|---|---|---|---|---|
| JP | 2010-286548 A | | 12/2010 | |
| JP | 2011158768 A | * | 8/2011 | |
| JP | 2013054116 A | * | 3/2013 | |
| JP | 2013213915 A | * | 10/2013 | |

* cited by examiner

MCF AS APPLIED TO METHOD A SUPPORTING
1-PLUG x 2-ROW APPLICATIONS

METHODS OF CONNECTORIZING MULTI-CORE FIBER OPTIC CABLES AND RELATED APPARATUS

RELATED APPARATUS

This application claims the benefit of U.S. Provisional Application No. 61/760,672, filed Feb. 5, 2013, which is herein incorporated by reference.

FIELD OF THE INVENTION

The present invention relates to communications cabling and, more particularly, to methods for connectorizing fiber optic cables that include multi-core optical fibers.

BACKGROUND

Fiber optic cables are cables that include one or more optical fibers that are used as a medium for transmitting optical communications signals. Fiber optic cables are used in a wide variety of applications such as, for example, in cable television networks, local area networks, vehicles, ships, airplanes, wide area networks and datacenters. Fiber optic cables may support very high data rate communications.

FIG. 1A is a perspective view of a conventional fiber optic cable 10. FIG. 1B is a cross-sectional view of one of the optical fibers 22 included in the fiber optic cable 10 of FIG. 1A. As shown in FIG. 1A, the fiber optic cable 10 includes an optical fiber bundle 20 that includes a plurality of optical fibers 22, a strength member 30 that may comprise, for example, a plurality of strength yarns 32 and an outer jacket 40. As shown in FIG. 1B, the optical fiber 22 includes a central core 24, a cladding layer 26 and a buffer coating 28. Typically, the coating 28 comprises an ultra-violet light cured urethane acrylate coating, although other coatings may be used. The core 24 and the cladding 26 may each be made of transparent glass (silica), although plastic is sometimes used. The cladding 26 has a lower index of refraction than the core 24. The difference in indexes of refraction of the core 24 and cladding 26 along with the angle at which an optical signal is injected into the core 24 may be selected so that the core 24 will act like a waveguide through which the optical signal will propagate with very low loss, reflecting off the surrounding cladding 26. The buffer coating 28 protects the core 24 and cladding 26 from moisture and/or physical damage.

Referring again to FIG. 1A, the strength yarns 32 may comprise, for example, aramid yarns or glass yarns. These strength yarns 32 further protect the optical fibers 22 from physical damage. The jacket 40 may comprise, for example, a polyvinyl chloride jacket that provides an additional layer of protection and holds all of the components of the cable 10 together to form an integral unit.

Each optical fiber 22 of fiber optic cable 10 may be physically spliced to an optical fiber of another cable or to network equipment via mechanical splicing or heat fusing. More commonly, however, a fiber optic cable, such as cable 10, will be terminated with one or more fiber optic connectors (not shown) to provide a fiber optic patch cord or jumper cable. The fiber optic connector may be used to connect the fiber optic cable to another fiber optic cable or to network equipment. When fiber optic cables include a plurality of optical fibers, one or both ends of the fiber optic cable may be broken out into subunits (i.e., smaller cable sections that each include a subset of the optical fibers) that are individually connectorized. Alternatively, fiber array connectors may be used to connectorize such multi-fiber fiber optic cables. Typically, these fiber array connectors align the optical fibers in a side-by-side configuration (or stacked layers of side-by-side optical fibers) for mating with similarly aligned optical fibers in a mating fiber optic connector.

As communications networks are required that will support higher and higher data rates, there is a demand for fiber optic cables that will support these higher data rates. One way that has been proposed for meeting the demand for increased communications bandwidth is the deployment of fiber optical cables that use "multi-core" optical fibers. A multi-core optical fiber refers to an optical fiber that includes more than one core that is used for transmission of optical communications signals. FIG. 2 is a cross-sectional view of a typical multi-core optical fiber 50. As shown in FIG. 2, the multi-core optical fiber 50 includes a central core 60 and a plurality of satellite cores 61-66. The central core 60 may have the same diameter as the satellite cores 61-66 or may have a different (e.g., larger) diameter. A cladding 70 surrounds the central core 60 and the satellite cores 61-66. The cladding 70 has a lower index of refraction than the central core 60 and the satellite cores 61-66. A buffer coating 80 protects the cores 60-66 and the cladding 70 from moisture and/or physical damage. As a multi-core optical fiber has a plurality of cores, each of which serves as a separate transmission medium, a multi-core optical fiber may have significantly increased transmission capacity as compared to a traditional "single-core" optical fiber. A multi-core optical fiber is known in the existing art. See for example, U.S. Pat. Nos. 5,734,773 and 6,154,594 and U.S. Published Applications 2011/0229085, 2011/0229086 and 2011/0274398, each of which is herein incorporated by reference.

DETAILED DESCRIPTION

Figure 1A:
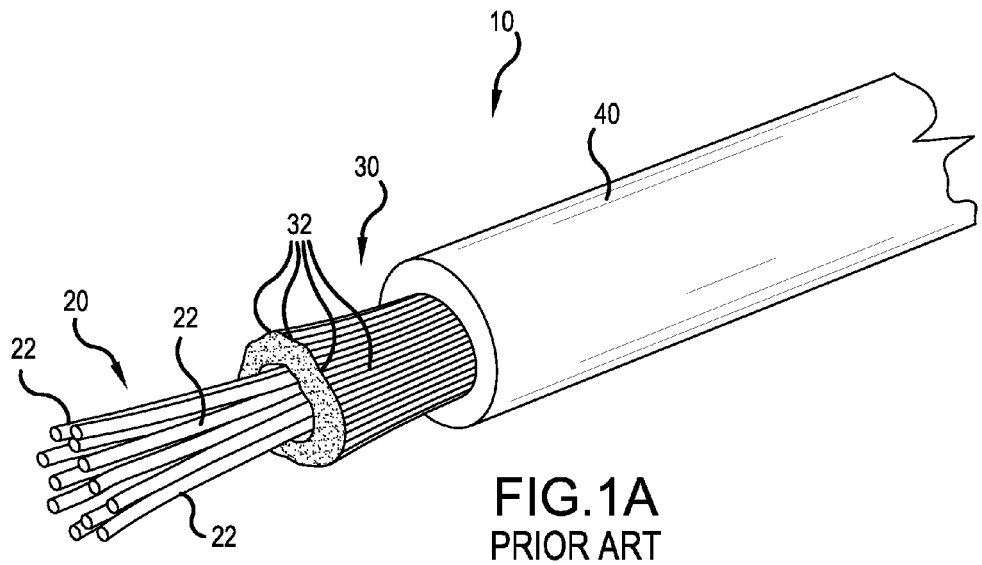
FIG. 1A is a perspective view of a conventional fiber optic cable.
Figure 1B:
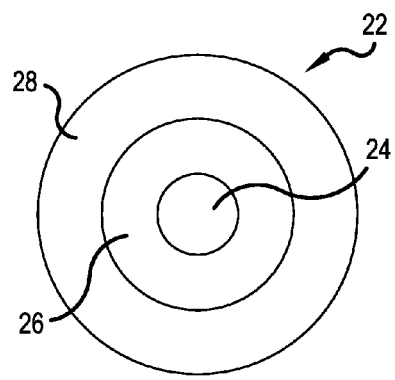
FIG. 1B is a cross-sectional view of one of the optical fibers of the fiber optic cable of FIG. 1A.
Figure 2:
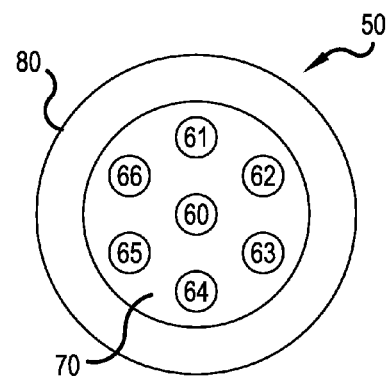
FIG. 2 is a cross-sectional view of a multi-core optical fiber.

Pursuant to embodiments of the present invention, methods of connectorizing fiber optic cables that include one or more multi-core optical fibers are provided. In particular, fiber rotational clocking techniques may be used to rotationally align the radial satellite cores of a multi-core optical fiber relative to a fixed point such as, for example, a keyway on a fiber optic connector. These methods may be used to, for example, install multi-fiber array connectors on one or both ends of a loose tube fiber optic cable that includes multi-core optical fibers. In some embodiments, the fiber optic cable may transition from the loose tube fiber optic cable to a ribbonized cable within the housing of the fiber optic connector. This may provide a number of advantages including, for example, providing a cable segment that is relatively flexible along its entire length, protecting the optical fibers from excess bending by transitioning to the ribbonized configuration within a rigid or semi-rigid housing, eliminating any need for furcation tubing, and/or simplifying the connectorization operation.

In some embodiments, the multi-core optical fiber is rotated until a selected one of the radial satellite cores of the multi-core optical fiber is aligned or angularly offset with respect to a lateral axis or a vertical axis. In another preferred embodiment, the alignment or offset is set relative to a physical feature located on a component of the connector rather than an axis of the connector. Herein, the longitudinal axis of a connectorized fiber optic cable refers to an axis defined by the center of the cable when the cable is pulled taut that extends the length of the cable. The lateral axis of a connectorized fiber optic cable refers to an axis that is parallel to a top surface of the connector (assuming that the connector has a generally rectangular housing) and normal to the longitudinal axis. The vertical axis refers to an axis that is normal to both the longitudinal axis and the lateral axis.

As known to those of skill in the art, conventional fiber optic connectors are designed to precisely align the one or more optical fibers that are received within the connector with the respective optical fibers of a mating connector to ensure that little optical signal power is lost due to misalignment of optical signal paths in the mated pair of connectorized fiber optic cables. This is particularly true when very small diameter optical fibers are used such as single-mode optical fibers, as even very small amounts of misalignment can result in large losses when such optical fibers are used. With the advent of multi-core optical fibers, it will be necessary to not only align the optical fibers with respect to the longitudinal, lateral and vertical axes, but it is also necessary to precisely fix the rotation of the optical fiber so that the satellite cores of the optical fiber are aligned with, for example, the proper satellite cores of a mating optical fiber. Such proper angular alignment will be necessary to reduce optical signal losses and/or to maintain polarity through one or more of the existing cabling standards.

Figure 3A:
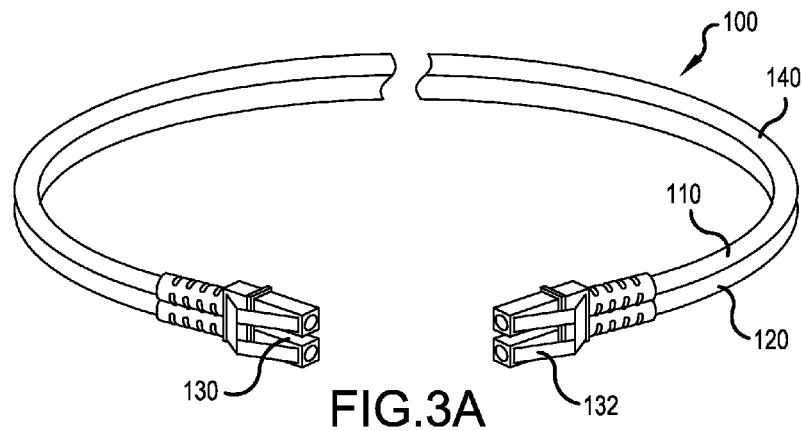
FIG. 3A is a perspective view of a connectorized duplex multi-core fiber optic cable according to embodiments of the present invention.
Figures 3B, 3C:
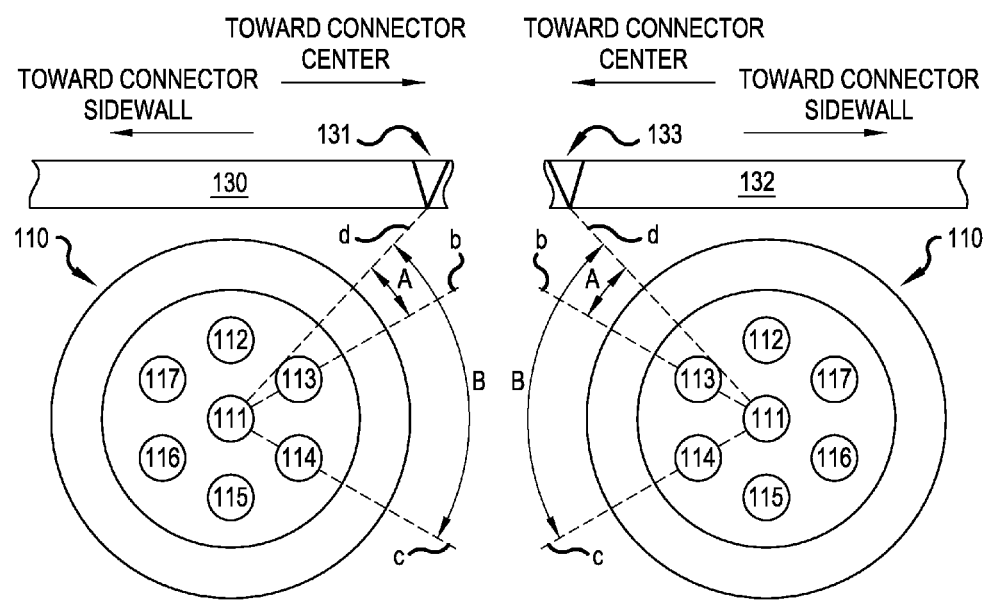
FIG. 3B is an end view of a first end of a first of the optical fibers included in the fiber optic cable of FIG. 3A that illustrates the positions of the seven cores included in the optical fiber.
FIG. 3C is an end view of a second end of the first of the optical fibers included in the fiber optic cable of FIG. 3A that illustrates the positions of the seven cores included in the optical fiber.

By way of example, FIG. 3A is a perspective view of a connectorized duplex multi-core fiber optic cable 100. FIG. 3B is an end view of a first end of a first of the optical fibers 110 that are included in the fiber optic cable 100 that illustrates the positions of the seven cores included in the optical fiber. FIG. 3C is an end view of a second end of the optical fiber 110.

As shown in FIG. 3A, the connectorized multi-core duplex fiber optic cable 100 includes first and second optical fibers 110, 120, first and second duplex connectors 130, 132 and a cable jacket 140. The cable may also include strength members (not shown). A first end of each of the optical fibers 110, 120 is terminated into the duplex connector 130, and a second end of each of the optical fibers 110, 120 is terminated into the duplex connector 132. As shown in FIG. 3B, at least the optical fiber 110 is a multi-core optical fiber. For example, as shown in FIGS. 3B and 3C, optical fiber 110 includes a central core 111 and satellite cores 112-117.

In order to maintain proper connectivity through a communications system, it is necessary to keep track of the angular alignment or clocking of each of the satellite cores 112-117 of the optical fiber 110 so that the satellite cores 112-117 can be properly aligned with the satellite cores of a mating multi-core optical fiber or with corresponding optical waveguides or the like. This may be accomplished by rotationally aligning the optical fiber 110 relative to a fixed indexing feature such as, for example, a keyway or an alignment mark in each of the duplex connectors 130, 132. By way of example, as shown in FIG. 3B, when the first end of the optical fiber 110 is terminated into the duplex connector 130, the satellite core 113 may be aligned along an angle A underneath or below an alignment mark 131 (with underneath or below meaning toward the center of the duplex connector 130). Only a small part of the connector 130 is shown in FIG. 3B to simplify the drawing. As shown in FIG. 3C, when the second end of the optical fiber 110 is terminated into the duplex connector 132, the satellite core 113 may similarly be aligned along an angle A underneath or below an alignment mark 133 (with underneath or below meaning located toward the center of the duplex connector 132). In this manner, the satellite cores 112-117 of optical fiber 110 will have traceable positions within the duplex connectors 130 and 132 when viewed from a fixed reference point, such that the technician will be able to quickly locate the desired satellite core (note that in FIGS. 3B and 3C the satellite cores 112-117 appear to have reversed or mirror-image positions, but this is because each of these figures are end views that look at the optical fiber 110 from different reference points).

In more specific terms, by using the alignment principals shown in FIGS. 3B and 3C, the satellite core 113 is located along line b, which passes through a center of the central core 111 and the center of satellite core 113. Line b resides "A"

degrees below line d (with "below" being defined as toward the center of the duplex connector), where line d passes through a center of the central core 111 and a point of the alignment mark 131. Once the designated or selected satellite core 113 is rotational aligned to the angle A, the other satellite cores 112 and 114-117 will be at known alignments relative to the alignment mark 131. For example, satellite core 114 is located along line c, which passes through a center of the central core 111 and the center of satellite core 114. Line c resides at an angle of "B" degrees below line d (with "below" being defined as toward the center of the duplex connector), where line d passes through the center of the central core 111 and the point of the alignment mark 131.

In comparing the duplex connector faces at the ends of the fiber optic cable 100, it can be seen that the multi-core optic fiber end on the left side of the duplex connector in FIG. 3B will be located on the right side of the duplex connector in FIG. 3C, and the multi-core optic fiber end on the right side of the duplex connector in FIG. 3B will be located on the left side of the duplex connector in FIG. 3C. Also, the satellite cores on one end of the duplex connector are mirror-image reversals, as compared to the satellite cores on the other end of the duplex connector. Despite the mirror-image arrangement, the location of each satellite core 112-117 can be precisely traced and located. For example in FIG. 3C, satellite core 113 is again, located on a line b which is A degrees below a line d connecting the center of central core 111 to the point of alignment mark 133 (where "below" is again defined as being offset in the direction toward the center of the duplex connector).

The alignment marks 131 or 133 may be formed on any portion of the connector 130 or 132. For example, the alignment marks 131 or 133 may be a keying or polarity feature, a corner edge, or a latch feature of the connector 130 or 132. In a preferred embodiment, the alignment marks 131 or 133 are formed on the ferrule or the ferrule holder, which is directly attached to the ferrule. By placing the alignment mark 131 or 133 on the ferrule or ferrule holder, a more precise alignment of the cores can be achieved relative to the alignment mark, since there are fewer intermediate parts between the multi-core optical fiber and the alignment mark 131 or 133, the intermediate parts are formed of precisely formed solid parts, and the parts are attached to each other, e.g., by epoxy. If the alignment marks 131 or 133 are provided on the plastic housing of the connector envelope, then the intermediate parts are not as precisely formed, e.g., molded plastic, and the intermediate parts may not be firmly attached to each other, as movement and tolerances may be required to permit spring compression for connector mating purposes.

Figure 3D:
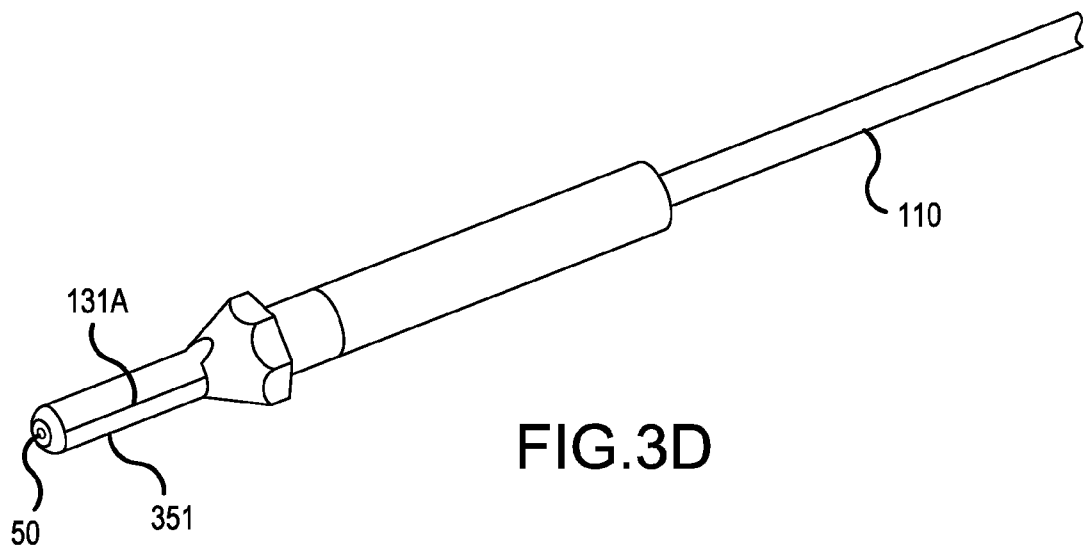
FIG. 3D is a perspective view of a cylindrical ferrule having an indexing feature on the ferrule's outer surface.
Figure 3E:
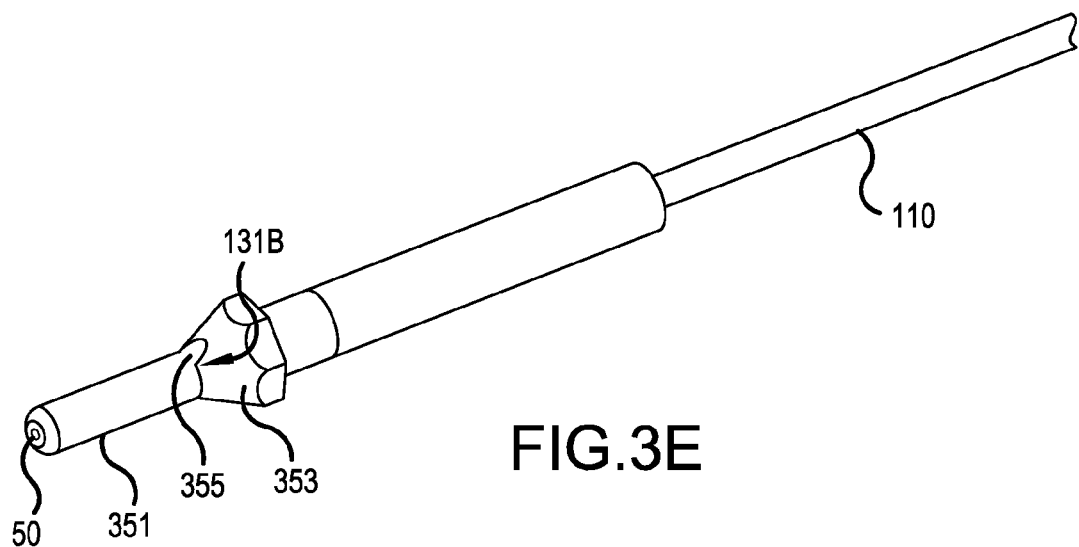
FIG. 3E is a perspective view of a cylindrical ferrule having an indexing feature on a ferrule holder.

FIG. 3D shows an embodiment wherein a notch, rigid or marking 131A is provided in or on an outer surface of a cylindrical ferrule 351. The notch or marking 131A may be used in the same manner as the alignment feature 131 of FIG. 3B, e.g., as an index mark to properly clock the rotation of multi-core fiber. FIG. 3E shows an embodiment wherein a feature 131B is provided on or in a ferrule barrel 353 holding a cylindrical ferrule 351. In a preferred embodiment, the feature 131B is a corner edge of a pre-existing tooling slot 355. The tooling slot 355 was previously used to select one of six potential rotational placements of the ferrule barrel 353 into the connector envelope to best center the prior art's single core optical fiber 22 within the connector envelope, as was taught in the existing art. See US Published Application 2002/0085815, which is herein incorporated by reference.

Figure 4A:
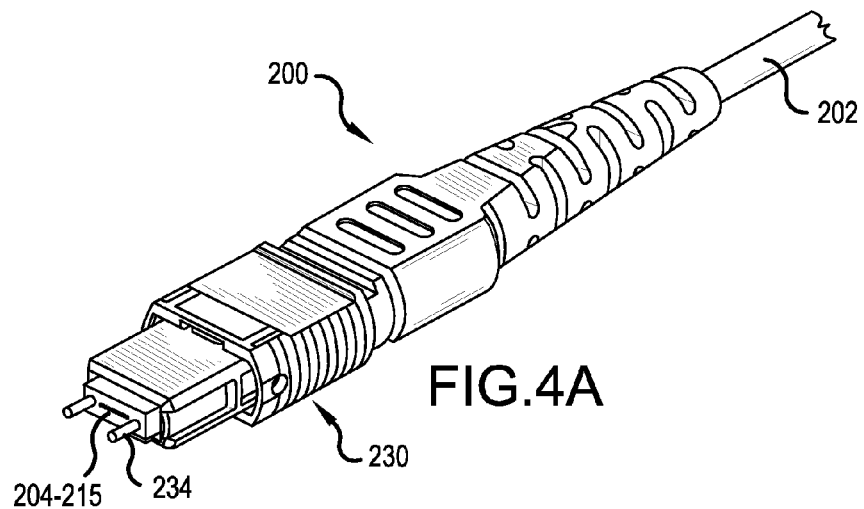
FIG. 4A is a perspective view of a portion of an MPO connectorized multi-core fiber optic cable according to further embodiments of the present invention.
Figure 4B:
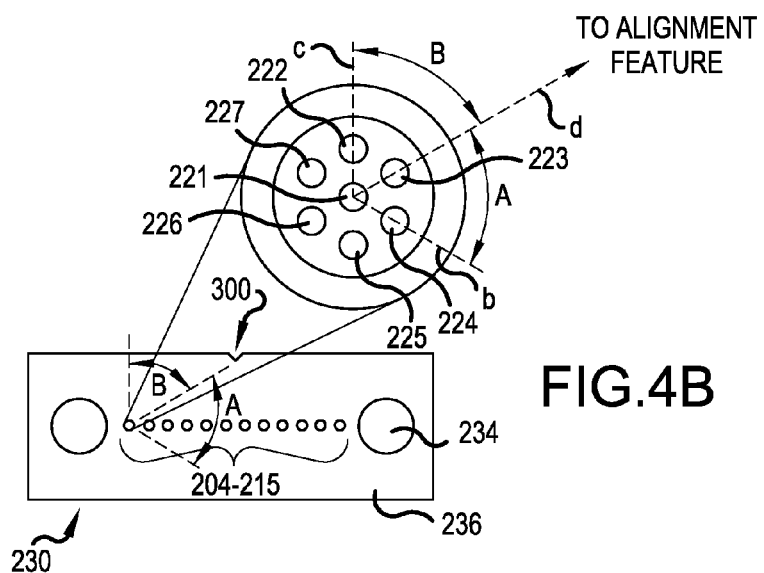
FIG. 4B is a schematic end view illustrating the front face of an MPO connector included on one end of the fiber optic cable of FIG. 4A that includes an enlarged insert that illustrates the seven cores of one of the optical fibers included in the cable.
Figure 4C:
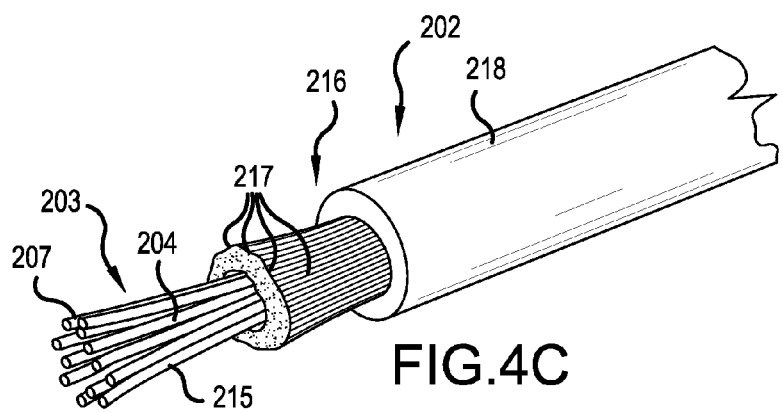
FIG. 4C is a perspective view illustrating an end of the fiber optic cable of FIG. 4A before it is connectorized.

In further embodiments which are illustrated with respect to FIGS. 4A-4C, the above-described techniques may be used with MPO/MTP connectors or other array type fiber optic connectors when terminating a fiber optic cable that includes multi-core optical fibers. FIG. 4A is a perspective view of a portion of an MPO connectorized multi-core fiber optic cable 200. FIG. 4B is a schematic end view illustrating the front face of an MPO connector 230 that is included on one end of the connectorized fiber optic cable 200 of FIG. 4A. The insert that is included in FIG. 4B illustrates the seven cores 221-227 of one of the optical fibers 204 included in the cable 200. Finally, FIG. 4C is a perspective view illustrating an end of the fiber optic cable 202 before it is connectorized.

As shown in FIG. 4A, the MPO connectorized fiber optic cable 200 includes a cable 202 and an MPO array connector 230 that is terminated onto a first end of the cable 202.

As shown best in FIG. 4C, the cable 202 may include a plurality of non-buffered optical fibers (here twelve optical fibers 204-215 are provided, but other numbers of optical fibers may be included) that collectively form a fiber bundle 203, a plurality of strength yarns 217 or other elements that form a strength member 216, and a protective jacket 218. Each of the twelve optical fibers 204-215 may be a multi-core optical fiber. In some embodiments, the cable 202 may have a round cross-section and the foregoing groups of components are substantially concentrically positioned about and extend together along the longitudinal axis. In some embodiments, the optical fibers 204-215 are loose with respect to one another in the cable 202 so that they have no particular, fixed relative orientation.

The strength member 216 at least partially surrounds the optical fiber bundle 203. The strength member 216 may be formed of any suitable material, such as aramid fibers, fiberglass, nylon or polyester. According to some embodiments, the strength member 216 may be formed of yarns 217 that each have a denier in the range of from about 250 to 3000. In some embodiments, the strength member 216 includes between about two and ten strands (which may each include hundreds of filaments).

The jacket 218 surrounds the strength member 216 and the optical fiber bundle 203, which reside in a longitudinal passage defined in the jacket 218. The jacket 218 may be formed of any suitable material, such as a polymeric material, for example, a thermoplastic polymer.

In some embodiments, the inner diameter of the jacket passage is greater than the combined cross-sectional diameter of the optical fiber bundle 203 and the strength member 216 so that at least the optical fibers 204-215 are loose and able to float within the jacket passage (i.e., move freely with respect to the jacket 218). In some embodiments, both the optical fibers 204-215 and the components (e.g., yarns 217) of the strength member 216 are loose and can float within the jacket passage. Thus, at least a portion of the volume of the jacket passage is not filled by the optical fibers 204-215 or the components of the strength member 216 to allow movement of the optical fibers 204-215 and the components of the strength member 216 within the jacket passage. The cable 202 may be referred to as a "round, loose tube cable." In some embodiments, a non-round (e.g., oval) loose tube fiber optic cable can be employed instead.

As shown in FIG. 4B, the MPO array fiber optic connector 230 is used to align the twelve optical fibers 204-215 with respect to the lateral and vertical axes by using a pair of precision alignment pins 234 that are received within alignment holes in a mating fiber optic connector. However, these alignment pins/holes 234 do not rotationally align the optical fibers 204-215.

In order to terminate the twelve optical fibers 204-215 included within cable 202 into the MPO array fiber optic connector 230, the optical fibers 204-215 are inserted within a ferrule 236 of MPO array connector 230. The acrylic coating is then stripped from each optical fiber 204-215, and the ends of the optical fibers 204-215 are precision cleaved (note that the stripping and/or cleaving operations may alternatively be performed before the optical fibers 204-215 are inserted into the ferrule 236). Then, each optical fiber 204-215 is rotated to align its six radial satellite cores (namely cores 222-227) into their proper position. Once all of the optical fibers 204-215 that are to be terminated into the MPO array fiber optic connector 230 have been clocked to their appropriate rotational position, an epoxy or other adhesive or affixing material may be injected into the ferrule 236 and cured to affix the optical fibers 204-215 in their aligned positions. Alternatively, the epoxy or other adhesive may be applied to the optical fibers 204-215 before the optical fibers 204-215 are inserted into the ferrule 236 and then the epoxy may be later cured after the optical fibers 204-215 have been clocked into their appropriate rotational position. Alternatively, the epoxy or other adhesive may be injected into the ferrule 236 after the optical fibers 204-215 are installed, then the optical fibers 204-215 are clocked into their appropriate rotational position, and then the epoxy is cured. Alternatively, the optical fibers 204-215 may be clocked and cure individually, e.g., one fiber at a time, within the epoxy-filled ferrule 236 using the methods of Applicant's co-pending U.S. application Ser. No. 14/149,949, filed Jan. 8, 2014, entitled "SELECTIVE UV CURING OF EPOXY ADJACENT TO OPTICAL FIBERS BY TRANSMITTING UV ENERGY THROUGH THE FIBER CLADDING," which is herein incorporated by reference.

To rotationally align each multi-core optical fiber, the position of one of the radial satellite cores 222-227 on each of the optical fibers (e.g., the first optical fiber 204, followed by the second optical fiber 205, etc.) may be set relative to a physical feature or mark on the connector 230. This may be accomplished, for example, by using a fiber end microscope with a reticle to identify the angular location of one of the radial satellite cores (e.g., core 222) on optical fiber 204. An optical signal in the visible wavelength range may be transmitted down the satellite core 222 during this identification process. Next, optical fiber 204 may be rotated to position the satellite core 222 in its correct angular position. In another method, a camera may be used to align a desired satellite core to a correct angular position. In yet another method, an aperture may be used in combination with a light power meter, as the desired satellite core (on one side of the aperture) comes into alignment with the aperture, the power meter (on the opposite side of the aperture) will sense a peak light measurement and hence the correct angular position of the desired satellite core can be judged by the power meter output.

Similar to the discussion relating to the LC duplex connectors, in FIGS. 4A-4C, an alignment feature (e.g., a corner of a keying features, corner of a polarity feature, mark on a ferrule, groove in a ferrule, corner of a ferrule or slot in a ferrule holder) may be used to set a desired rotational alignment of selected satellite cores for each of the multi-core optical fibers 204-215. With reference to FIG. 4B, if satellite core 224 is selected, the multi-core optical fiber 204 can be rotated until the line b (which passes through the centers of the central core 221 and the selected satellite core 224) resides at an angle A below the line d, where the line d passes through the center of the central core 221 and a point of the alignment mark 300 and where "below" is defined as being toward the center of the MT ferrule 236. Once this rotational alignment is accomplished, the remaining satellite cores will have known angular positions. For example, the satellite core 222 will reside along a line c which is located at an angle of B "above" the line d (where "above" is defined as toward the outside of the MT ferrule).

The rotation of the multi-core optical fibers 204-215 may be done using an apparatus or by hand. After each optical fiber 204-215 is rotated to its correct position, an epoxy injected into the ferrule, or previously applied to the optical fibers 204-215 before insertion into the ferrule, may be cured to permanently affix the optical fibers 204-215 in their aligned positions.

Figure 5:
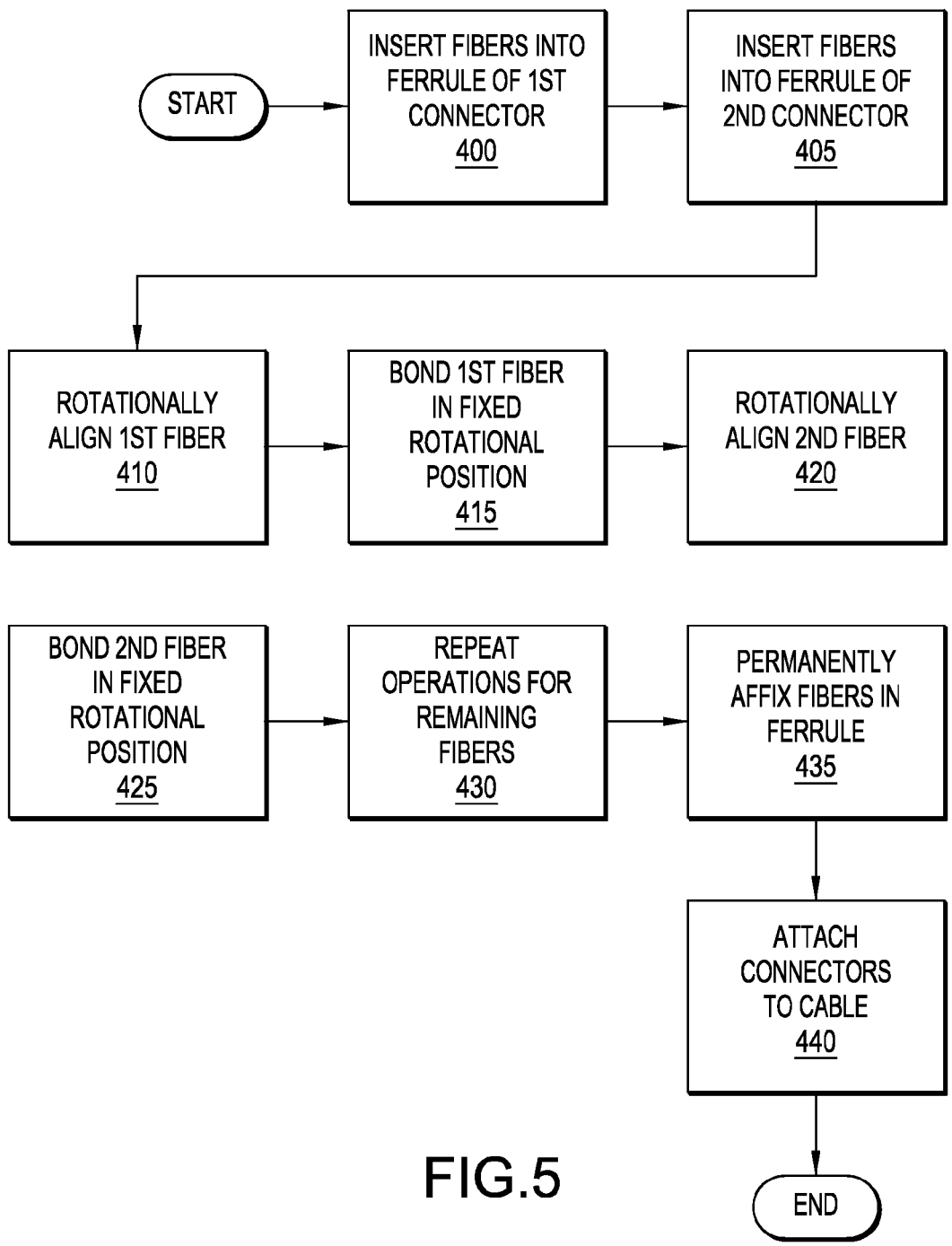
FIG. 5 is a flow chart illustrating operations for connectorizing a fiber optic cable that includes multi-core optical fibers according to embodiments of the present invention.

FIG. 5 is a flow chart illustrating methods of connectorizing a fiber optic cable that includes a plurality of multi-core optical fibers according to certain embodiments of the present invention. As shown in FIG. 5, operations may begin with inserting first ends of optical fibers into a first ferrule of a first fiber optic connector (block 400). This operation may be done by hand by a technician or may be an automated or semi-automated operation. Next, the other ends of the optical fibers may be inserted into a second ferrule of a second fiber optic connector (block 405). A first of the multi-core optical fibers may then be rotated to rotationally align a selected satellite core relative to an alignment feature of the first connector (block 410). Once the first optical fiber has been rotationally aligned, it may be held and then bonded in a fixed rotational position (block 415). Next, a second of the optical fibers may be rotated to rotationally align a selected satellite core of the second optical fiber relative to the alignment feature (block 420). Thereafter, the second optical fiber is held and then bonded in a fixed rotational position (block 425). The above operations may then be repeated on the remainder of the optical fibers in the first and second connectors, using the same alignment procedures in the second connector as were used in the first connector (block 430). Finally, once all of the optical fibers have been rotationally aligned, an epoxy may be thoroughly cured to permanently affix the optical fibers in place (block 435). Finally, the connector envelope features may be attached to the ferrule to form a finished termination, e.g., an LC or MPO type connector (block 440). The ability to individually bond fibers into a multi-fiber array type ferrule can be performed by selectively introducing epoxy to the fiber being aligned and bonded, or alternatively, the ferrule may be flooded with epoxy and the fibers individually bonded using techniques as disclosed in Applicant's co-pending application U.S. Ser. No. 14/149,949 filed Jan. 8, 2014, which was previously incorporated by reference.

Figure 6A:
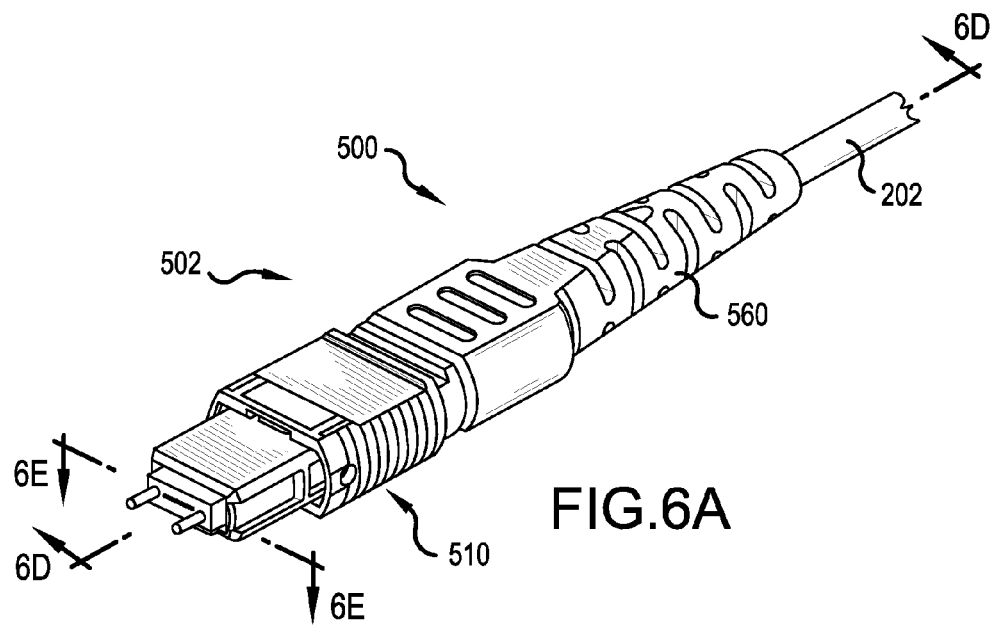
FIG. 6A is a front perspective view of a portion of a connectorized fiber optic cable according to further embodiments of the present invention.
Figure 6B:
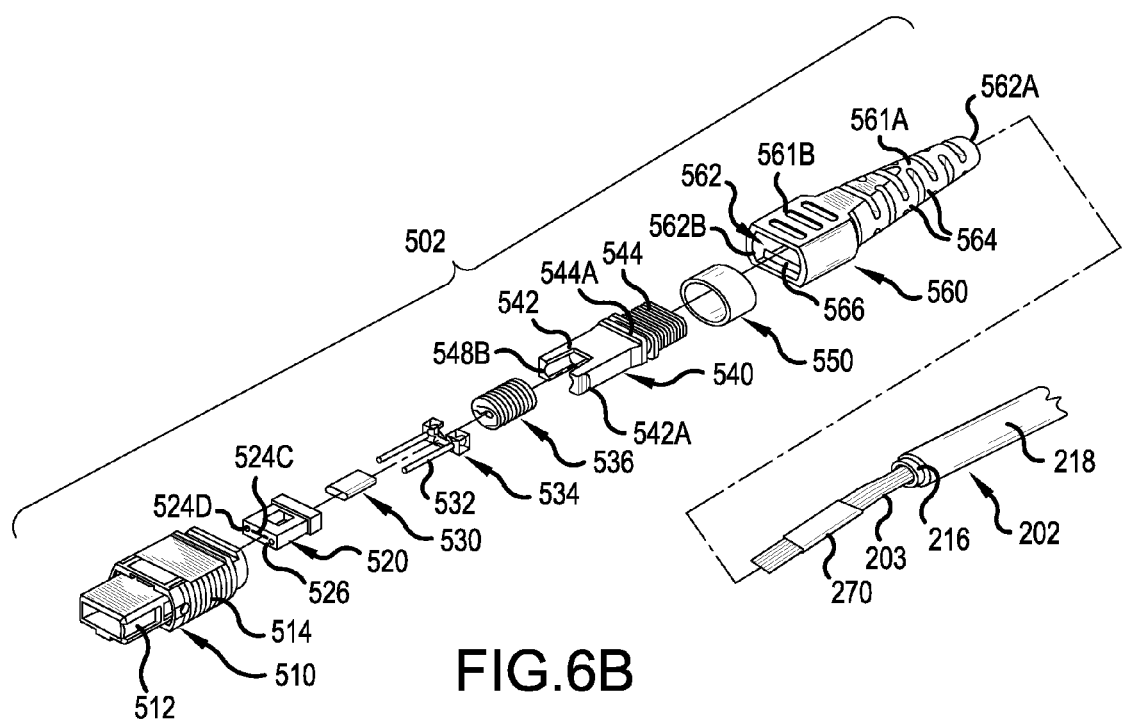
FIG. 6B is a front, exploded, perspective view of a connector of FIG. 6A.
Figure 6C:
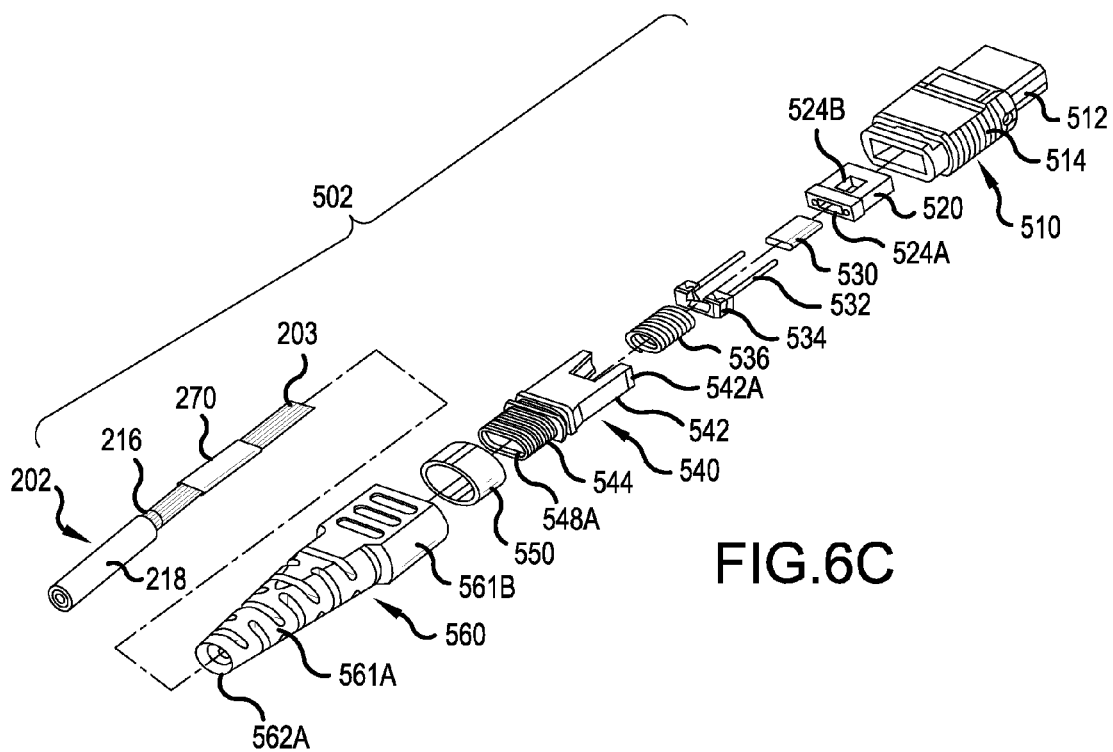
FIG. 6C is a rear, exploded, perspective view of the connector of FIG. 6B.
Figure 6D:
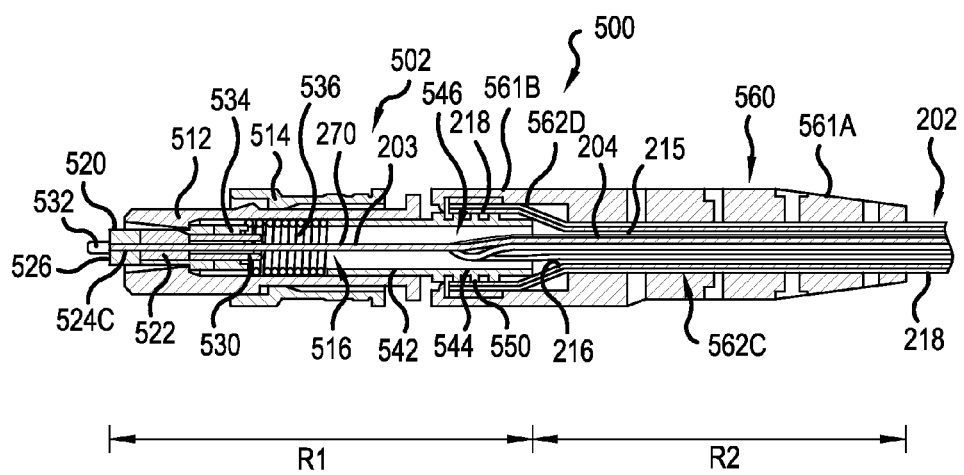
FIG. 6D is a cross-sectional view of the connectorized fiber optic cable of FIG. 6A taken along the line 6D-6D of FIG. 6A.
Figure 6E:
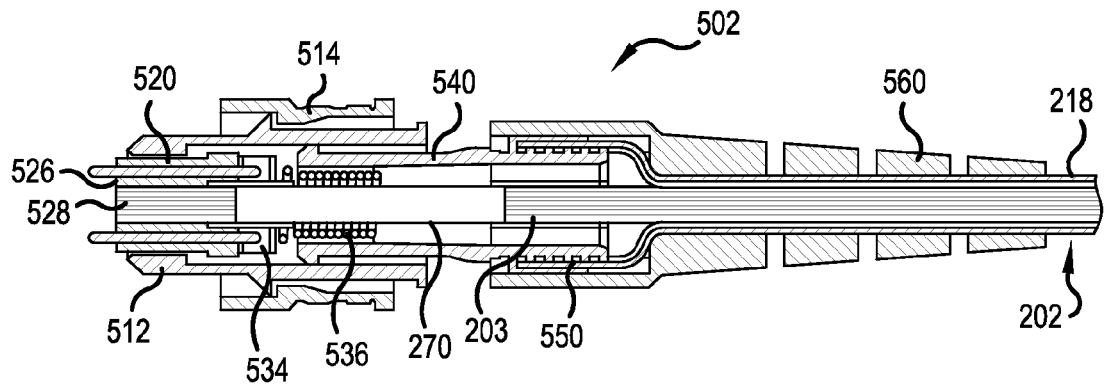
FIG. 6E is a cross-sectional view of the connectorized fiber optic cable of FIG. 6A taken along the line 6E-6E of FIG. 6A.

FIGS. 6A-6E illustrate a connectorized fiber optic cable 500 according to further embodiments of the present invention. In particular, FIG. 6A is a perspective view of a portion of the assembled connectorized cable 500. FIGS. 6B and 6C are exploded front and rear perspective views of a connector assembly 502 of the connectorized cable 500, respectively. FIG. 6D is a cross-sectional view of the connectorized fiber optic cable 500 of FIG. 6A taken along the line 6D-6D of FIG. 6A, and FIG. 6E is a cross-sectional view of the connectorized fiber optic cable 500 of FIG. 6A taken along the line 6E-6E of FIG. 6A.

The connectorized cable 500 includes the fiber optic cable 202 (discussed above with reference to FIG. 4C) and the connector assembly 502. In the depicted embodiment, the connector assembly 502 presents multi-core optical fibers 204-215 in an array using an MT type ferrule 520 to form a multi-fiber push-on (MPO) connector or an MTP connector. Of course, the present invention could also present multi-core optical fibers 204-215 in one or more arrays in other connector configurations. The connector assembly 502 may be a plug connector as shown or, alternatively, a female jack connector with suitable modifications.

Referring to FIGS. 6B-6E, the connector assembly 502 includes a front connector housing 510, a ferrule 520, epoxy 528, a ferrule boot 530, ferrule pins 532, a pin retainer 534, a spring 536, a rear housing 540, a crimp sleeve 550, and a strain relief boot 560.

The front housing 510 has a forward portion 512 and a rear portion 514. The front housing 510 may be substantially rigid. In some embodiments, the front housing 510 is formed of a thermoplastic or a polymeric material such as polyetherimide. The front housing 510 may be formed using any suitable method such as molding. The front housing 510 includes a passage 516 that may have a generally oval or rectangular lateral cross-section.

The ferrule 520 defines a cavity 522 and a rear opening 524A and a top opening 524B each communicating with the cavity 522. Fiber holes 524C and pin holes 524D extend longitudinally through the ferrule 520. The fiber holes 524C are configured in side-by-side alignment across the width of the ferrule 520. The ferrule 520 has a front face 526. The ferrule 520 may be formed of, for example, a polymeric material. The ferrule boot 530 is tubular and may be formed of rubber, thermoplastic, a thermoplastic/rubber copolymer, or similar materials. The epoxy 528 may be a UV and/or a thermal cure epoxy.

The rear housing 540 includes a front section 542 and a rear section 544. A pair of opposed latch tabs 542A extend laterally outwardly from the front section 542. Ribs 544A are formed on the rear section 544. A passage 546 extends longitudinally through the rear housing 540 from a rear opening 548A to a front opening 548B. The rear housing 540 is substantially rigid. The rear housing 540 may be formed of, for example, thermoplastic or a polymeric material such as polyetherimide.

The strain relief boot 560 includes a rear section 561A and a front section 561B. A passage 562 extends longitudinally through the strain relief boot 560 from a rear opening 562A to a front opening 562B. The passage 562 has a generally cylindrical rear section 562C and a generally oval or rectangular front section 562D. Outer ribs 564 are formed on the rear section 561A. Opposed top and bottom retention ribs 566 extend inwardly into the passage 562 adjacent the front opening 562B. The strain relief boot 560 may be formed of, for example, a polymeric material, a thermoplastic, a thermoplastic elastomer, or thermoplastic rubber. According to some embodiments, the strain relief boot 560 has a flexural modulus of between about 0.05 and 0.5 GPa and according to some embodiments, the flexural modulus may be higher with segmented strain relief designed to allow additional flex.

The optical fibers 204-215 extend through the fiber holes 524C in the ferrule 520 such that fiber ends are located at the front face 526 of the ferrule 520. The optical fibers 204-215 are secured in the ferrule 520 by the epoxy 528. The ferrule 520 is positioned in the front housing passage 516 such that a portion of the ferrule 520 extends forwardly of the front housing 510. The rear housing 540 is coupled to the front housing 510 by the tabs 542A such that the front section 542 is retained in the passage 516. The ferrule boot 530 and the spring 536 surround the optical fibers 204-215. The ferrule 520 is held in the passage 516 by the pin retainer 534, which is held in place by the spring 536, which is braced by the inner housing 540. The pins 532 extend through the pin holes 524D such that they protrude from the front face 526. The pins 532 are also held in place by the pin retainer 534.

The strength member 216 and the jacket 218 are secured to the rear housing 540 by the crimp ring 550. In particular, segments of the strength member 216 and the jacket 218 are captured between the rear section 544 of the rear housing 540 and the crimp sleeve 550, which is crimped in place.

The strain relief boot 560 is secured to the rear housing 540 by the ribs 566, which engage the front edge of the crimp sleeve 550. The rear section 544 is positioned in the front passage section 562D. A layer of tape 270 (or adhesive) may be present on the fiber bundle 203 within the front housing 510 and/or the rear housing 540 and/or a rear portion of the ferrule 520 inside the epoxy 528.

As shown in FIGS. 6D and 6E, the fiber bundle 203 extends from the front face 526, through the front housing 510, the ferrule 520, the ferrule boot 530, the spring 536, the rear housing 540, the crimp sleeve 550 and the strain relief boot 560. The fiber bundle 203 has three segments or sections, as follows: a ribbonized fiber section that is within the connector housing 510/540, a non-ribbonized fiber section in the cable 202, and a fiber transition section in the rear housing that is between the ribbonized and non-ribbonized sections. In the ribbonized section, the optical fibers 204-215 are aligned in ordered, side-by-side relation with one another (which may be referred to herein as a "ribbon configuration"). In some embodiments, the portions of the optical fibers 204-215 in the ribbonized section are disposed and extend generally in a single row. In the non-ribbonized section, the optical fibers 204-215 are generally loose and disposed in various non-mutual planes. In the non-ribbonized section the optical fibers 204-215 have a generally round configuration. In the transition section, the optical fibers 204-215 are undergoing a transition (i.e., changing, converting, transforming or transiting) from the loose configuration to the ribbonized configuration.

With reference to FIG. 6D, the connector assembly 500 has a fixed or rigid region or portion R1 on the plug side and a strain relief or bendable region or portion R2 on the cable side. In the portion R1, the connector assembly 500 prevents the fiber bundle 203 from being bent. In some embodiments, the rigid portion R1 may extend rearwardly beyond the rear opening 548A of the rear housing 540. In the portion R2, the connector assembly 502 may permit non-destructive bending of the cable 202. In particular, the rear section 561A of the strain relief boot 560 can be bent with decreasing amounts of strain relief and bend radius limitation from the rear housing 540 to the boot rear opening 562A. The strain relief boot 560 may limit the cable bend angle to a gradual bend to thereby prevent or reduce bend related fiber breaks and/or performance losses. Thus, in some embodiments, at least a portion of the strain relief boot 560 is semi-rigid to provide controlled fiber bend.

The loose optical fibers in the round, loose tube fiber cable 202 are converted or reconfigured to a ribbonized fiber bundle within the rigid portion R1 of the connector assembly 502. Thus, the entirety of the ribbonized fiber section is contained in the rigid portion R1. Thus, the ribbonized fiber bundle may be located where it cannot be bent during use. This termination allows for the benefits of round, loose fiber cabling up to the connector termination. For example, as compared to ribbon cable or a cable furcation assembly, a round, loose cable segment may be easier to bend, may be bendable with less loss of cable performance, and may have less or no preferential bending limitations. Moreover, termination in accordance with embodiments of the present invention may obviate the need for furcation tubing and the related expense, mess and effort.

Figure 6F:
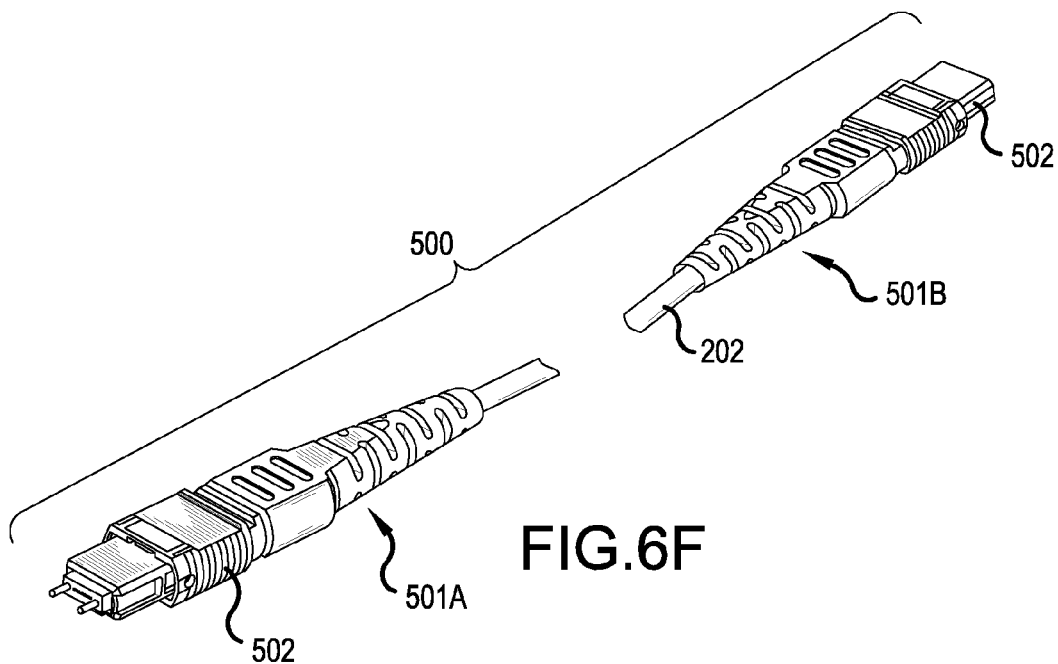
FIG. 6F is a fragmentary, perspective view of a patch cord in accordance with embodiments of the present invention.
Figure 7:
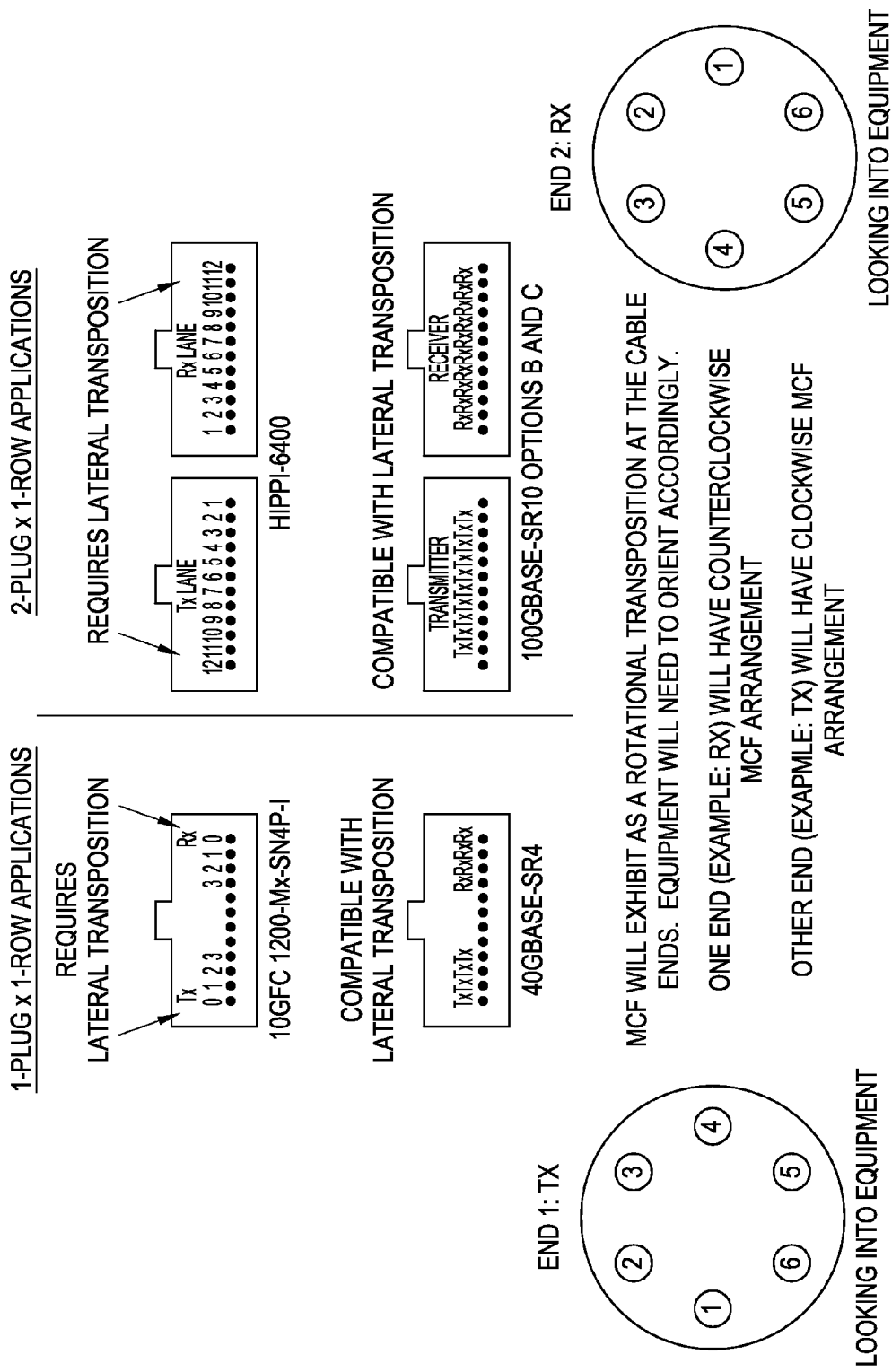
FIGS. 7-16 demonstrate how a 1×n MCF (examples shown are for a 1×6 multi-core fiber with the center core not shown) handles polarity, and expected arrangements of the satellite cores at adapters and the equipment ends using Type A, B and C patch cords.
Figure 8:
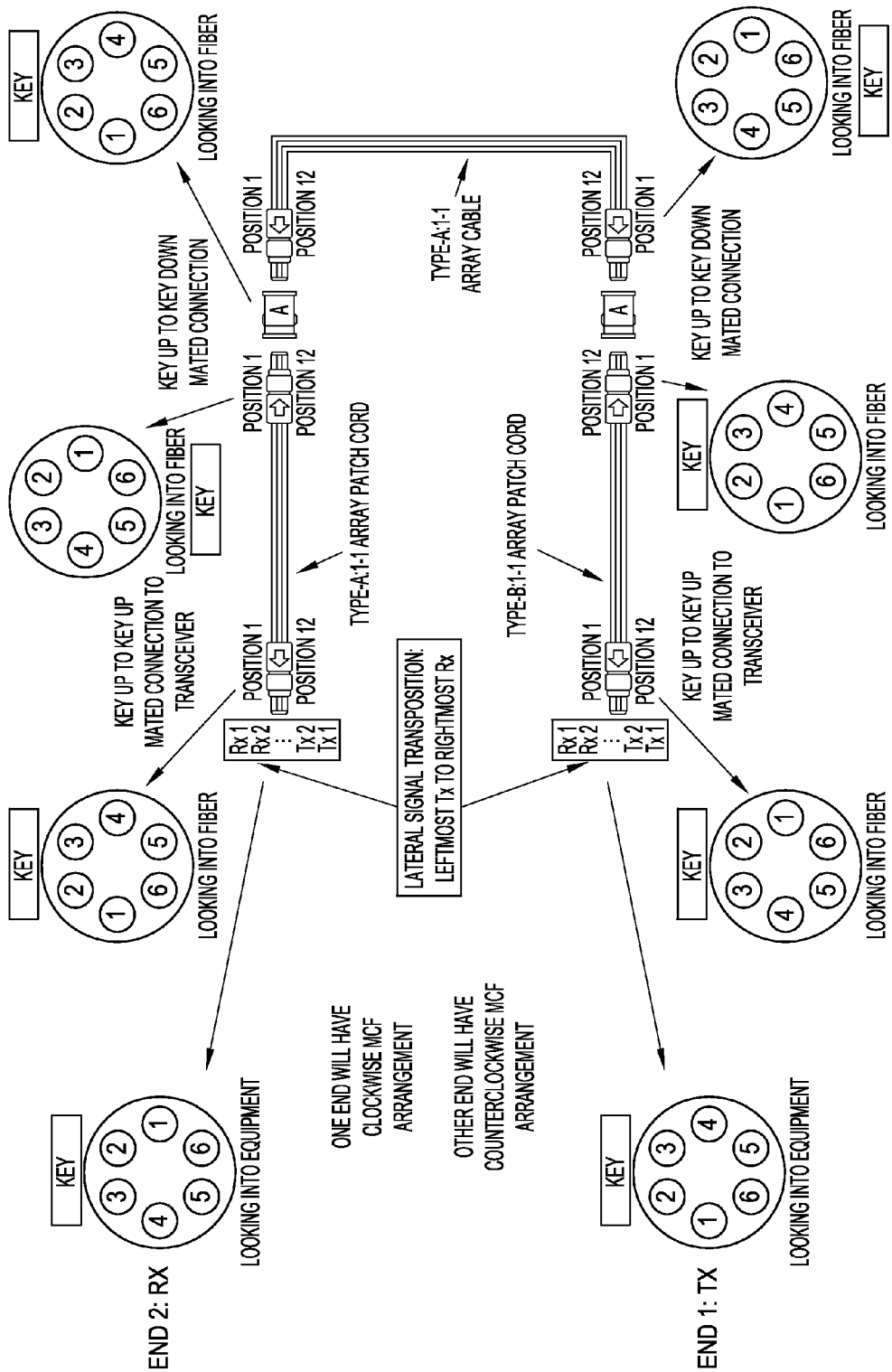
Figure 9:
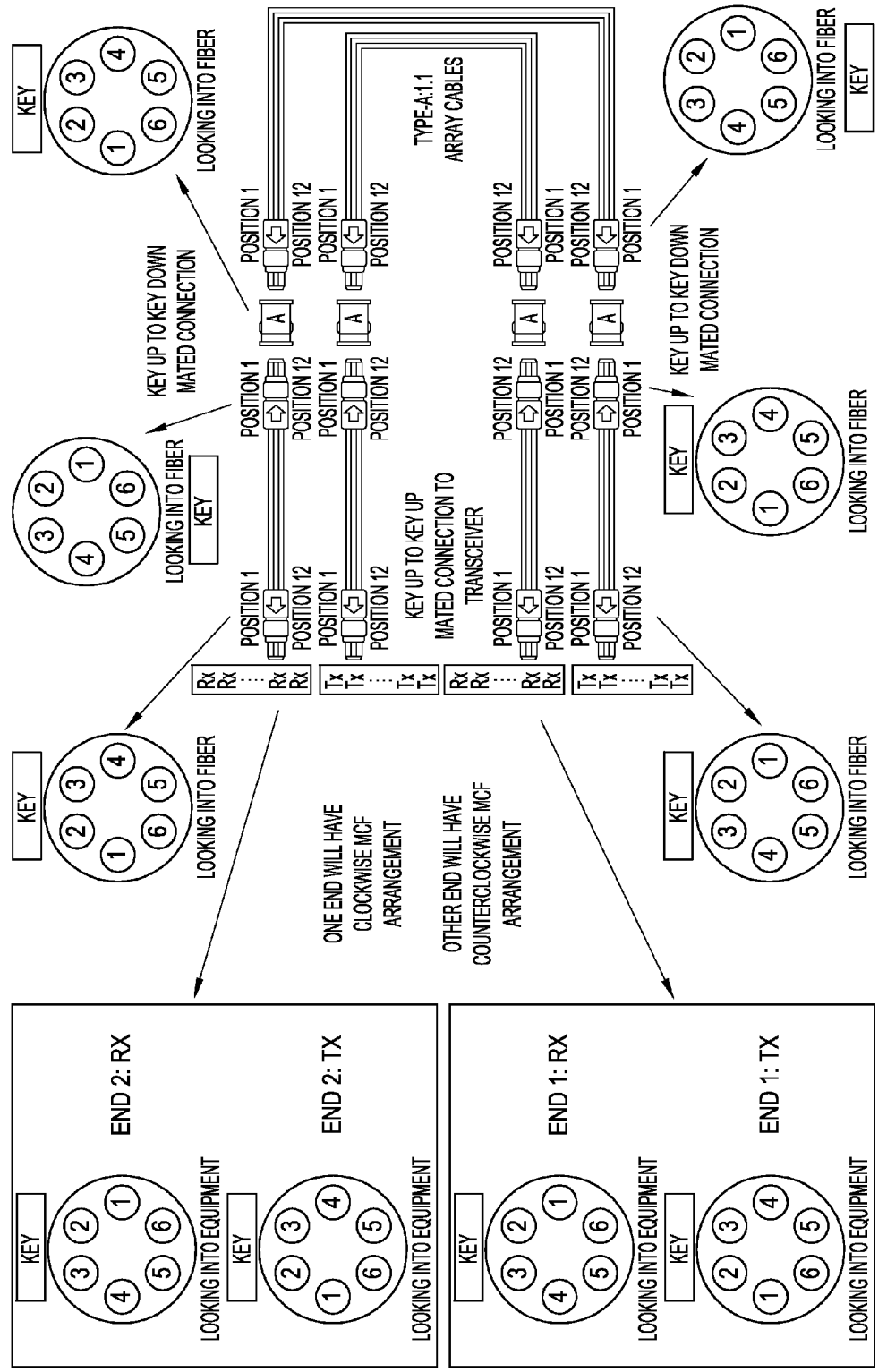
Figure 10:
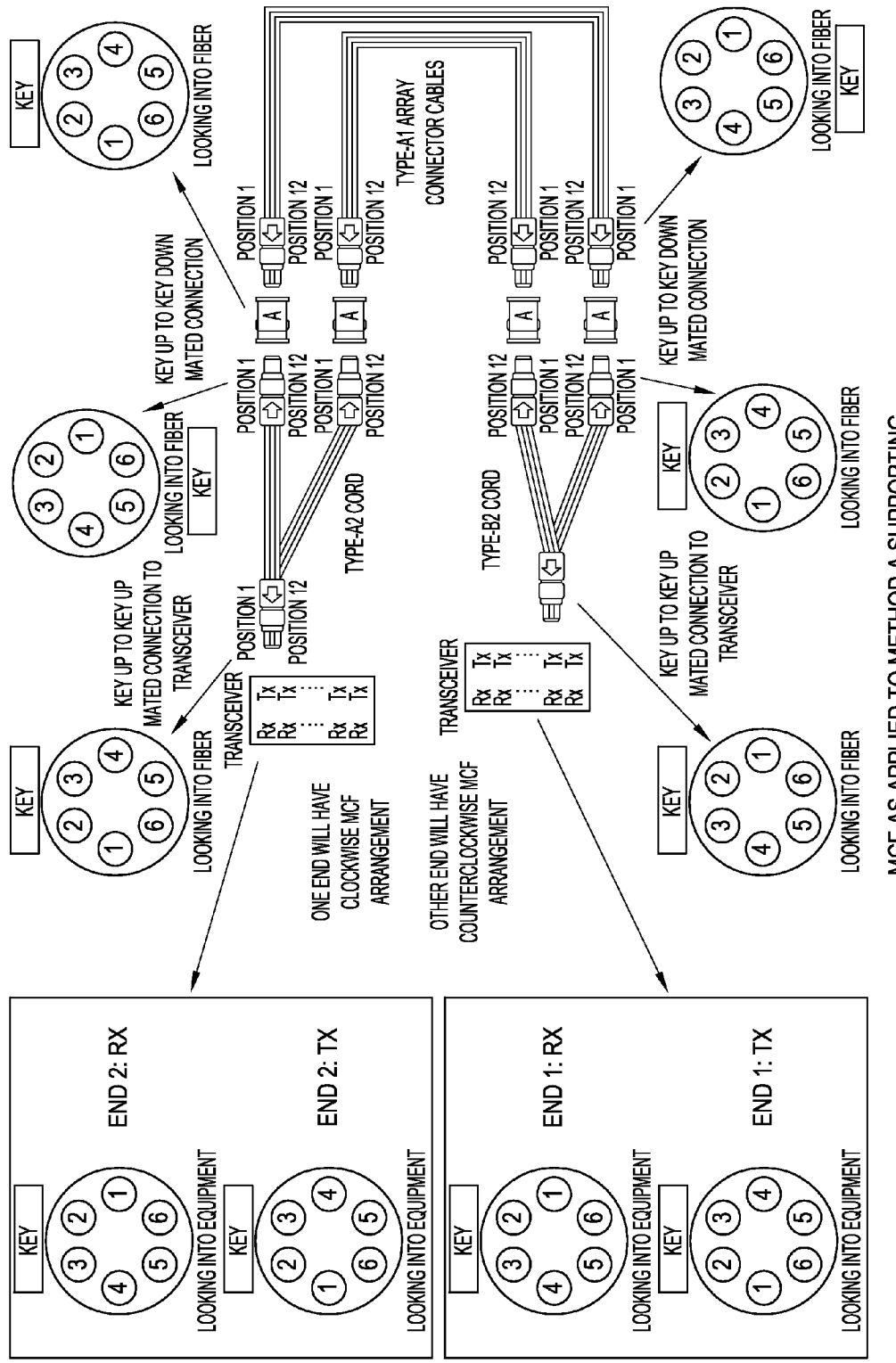
Figure 11:
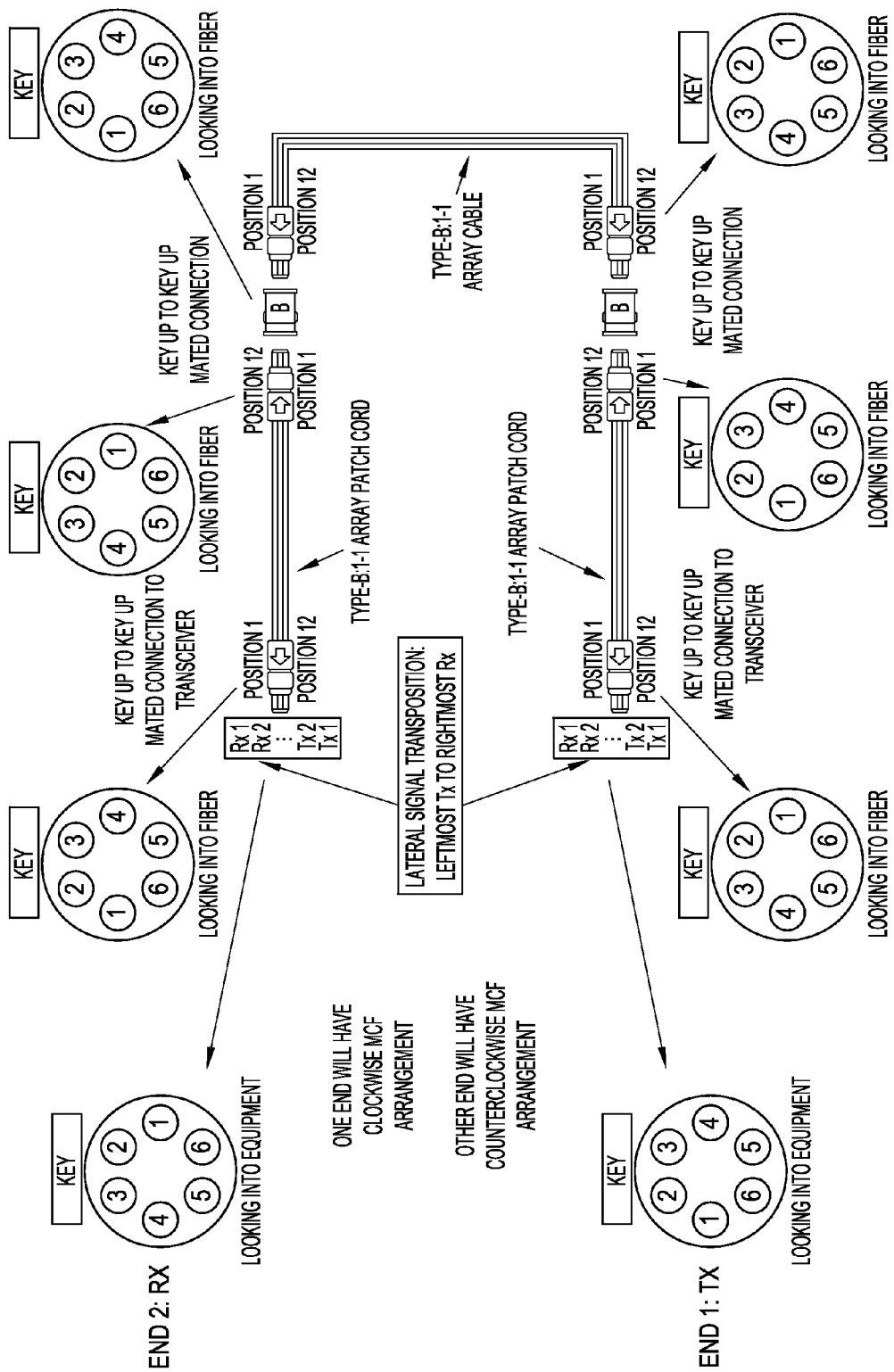
Figure 12:
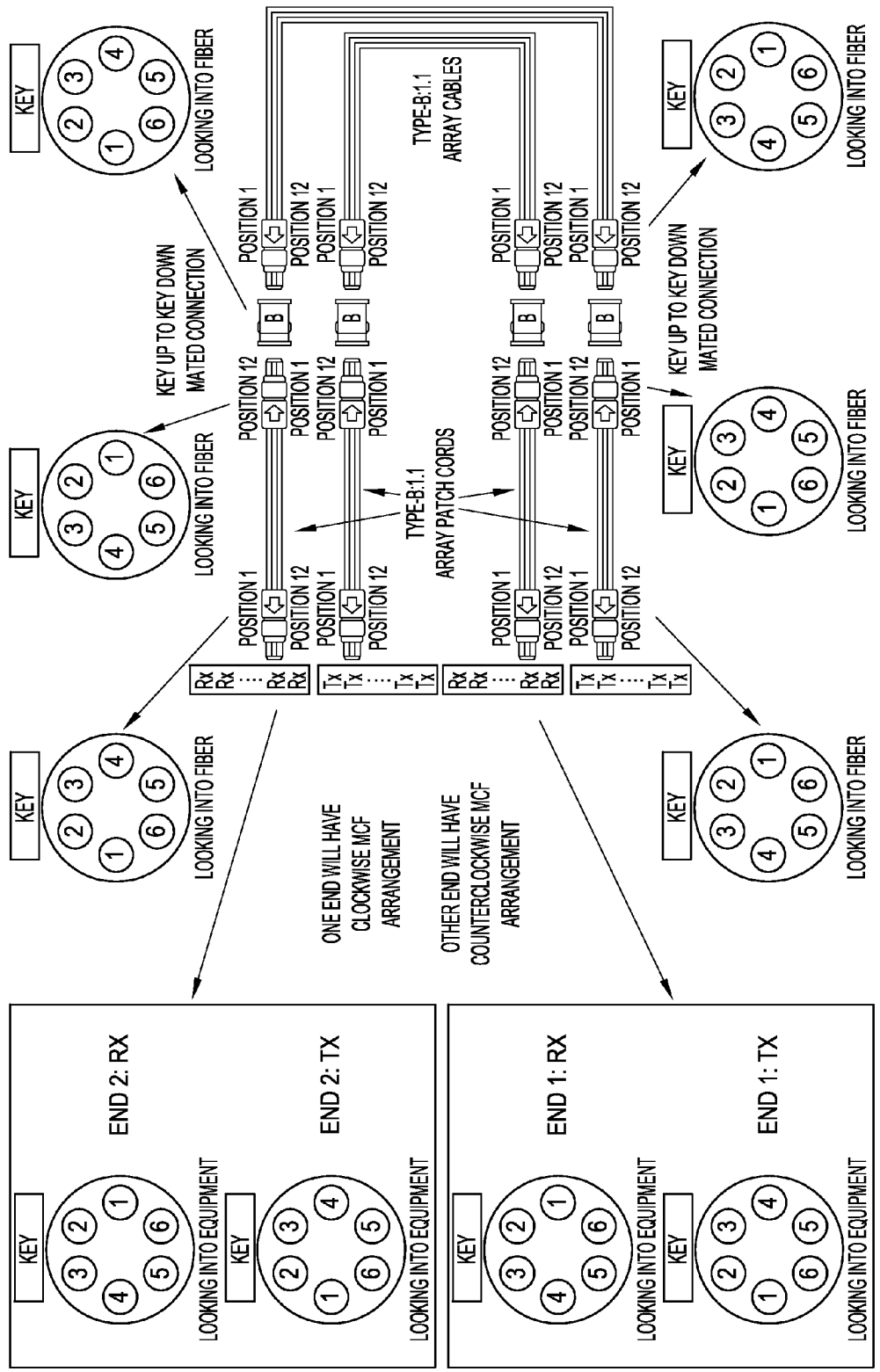
Figure 13:
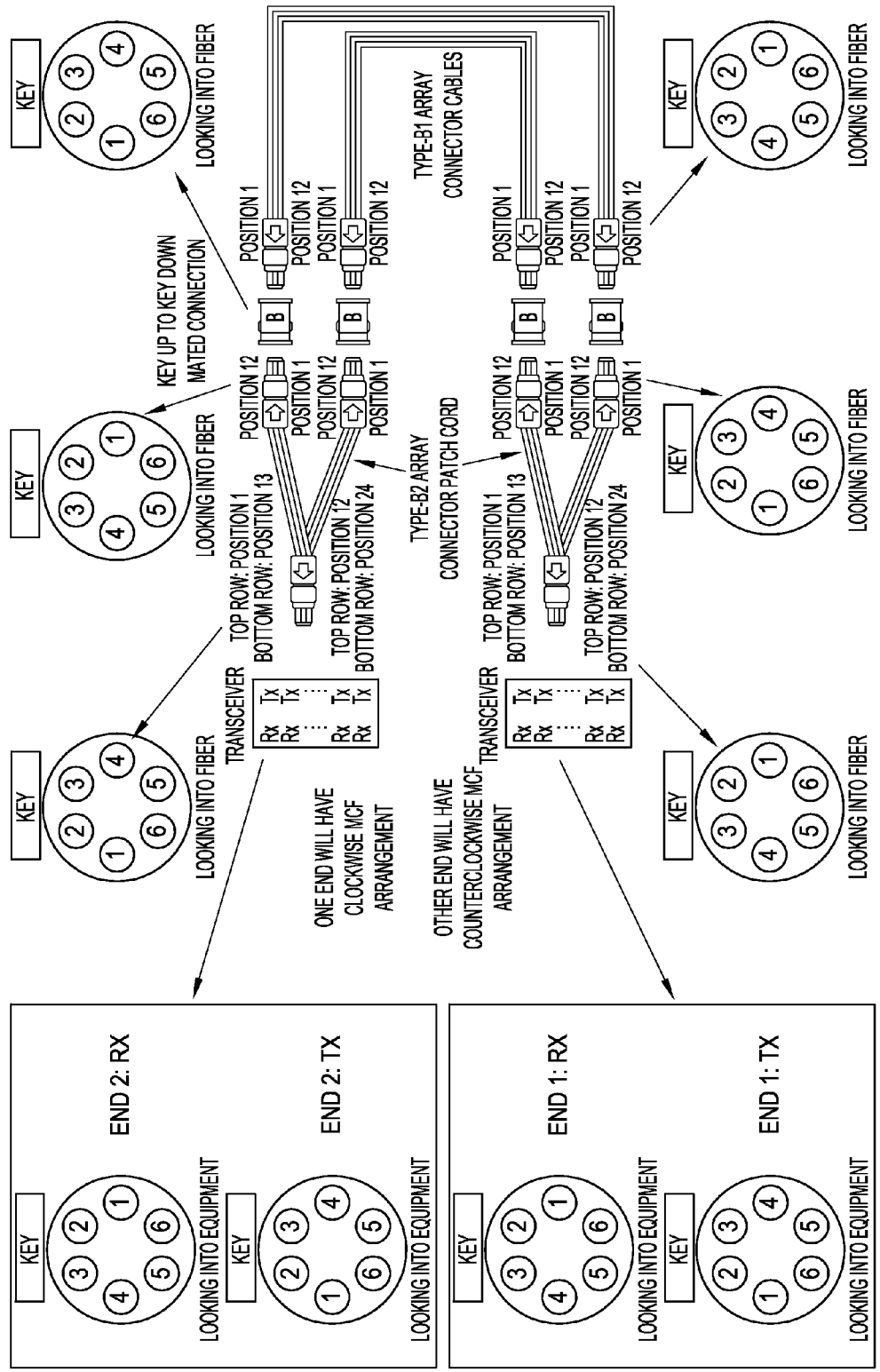
Figure 14:
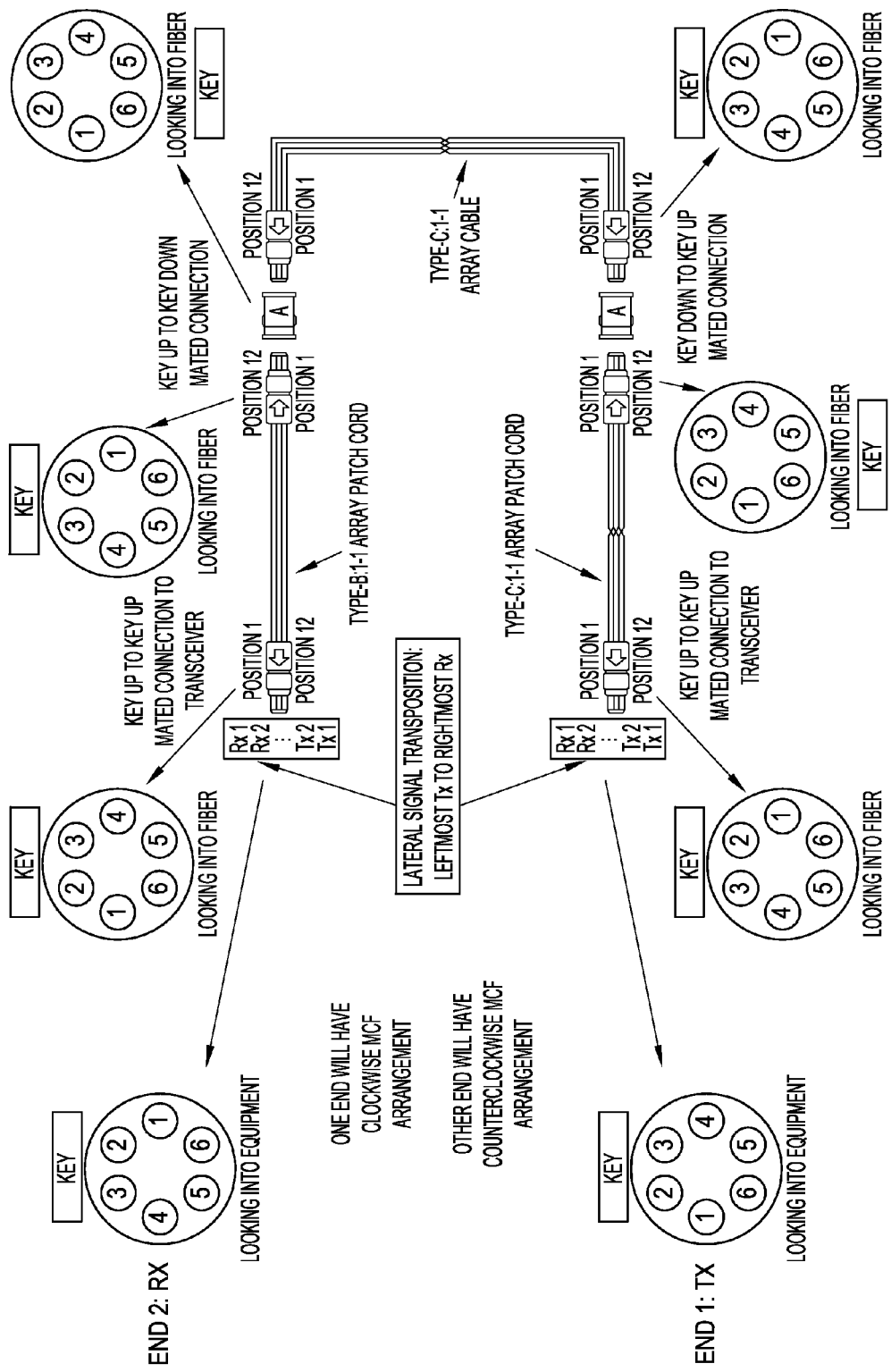
Figure 15:
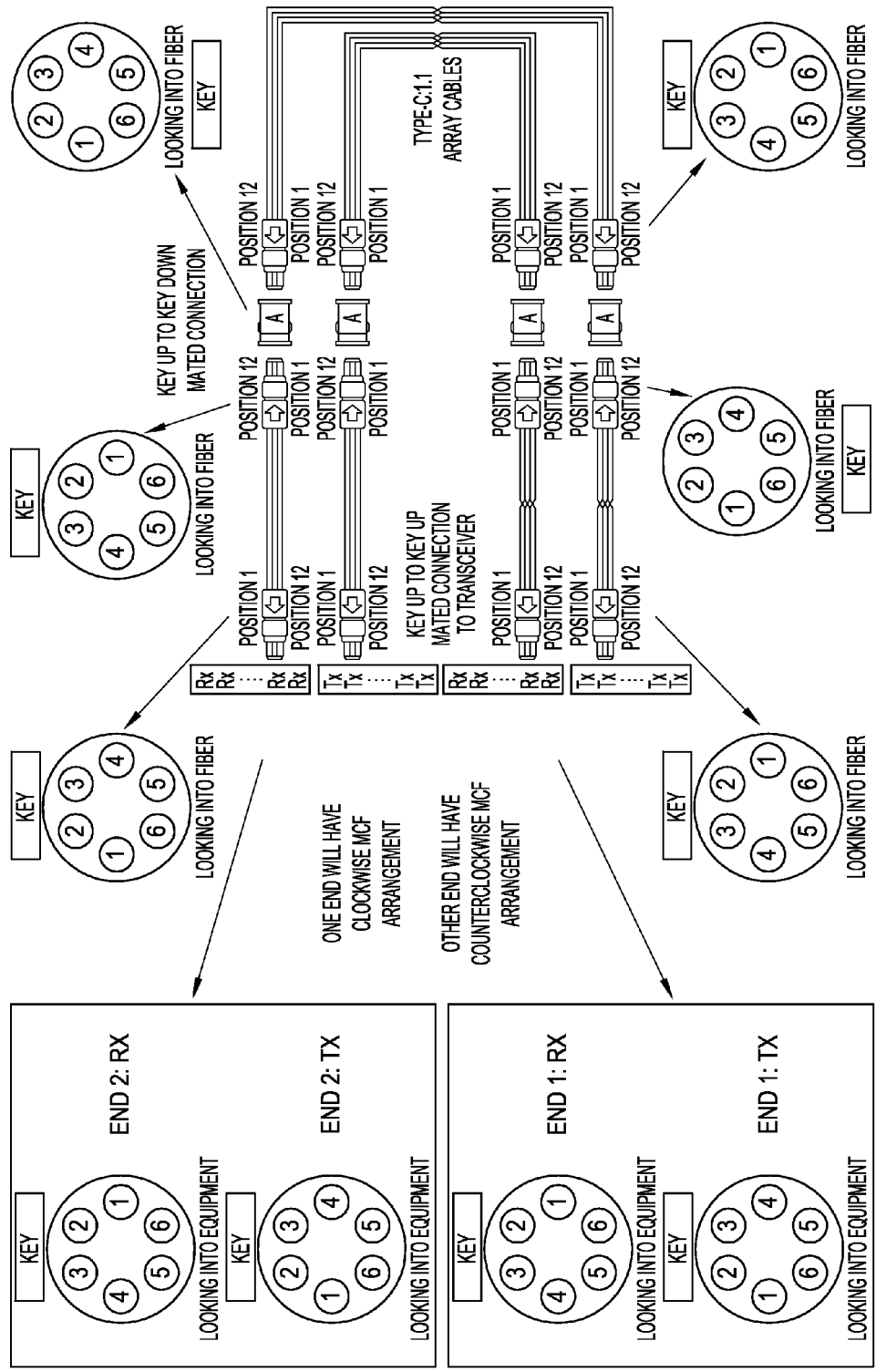
Figure 16:
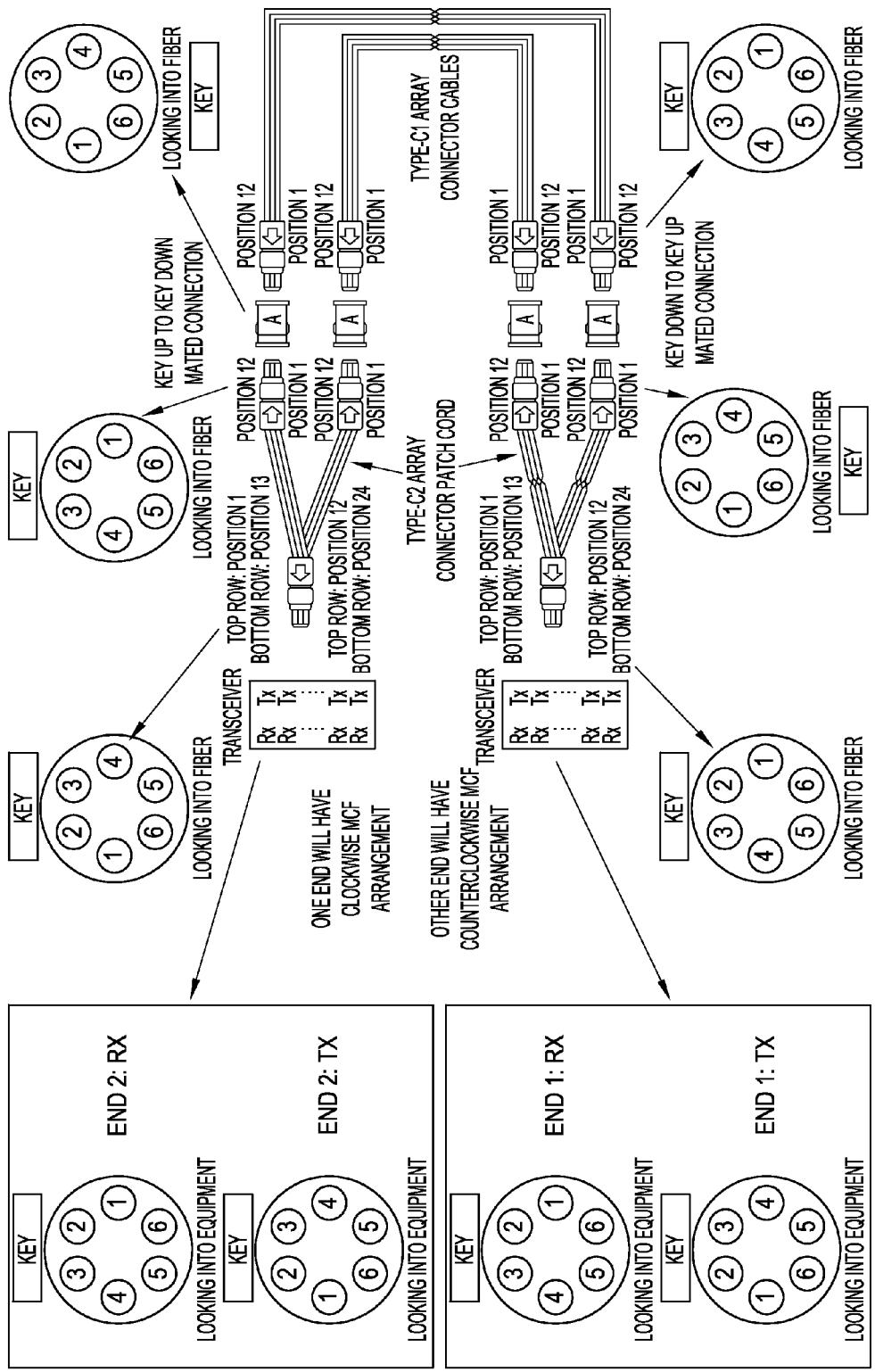
Figure 17:
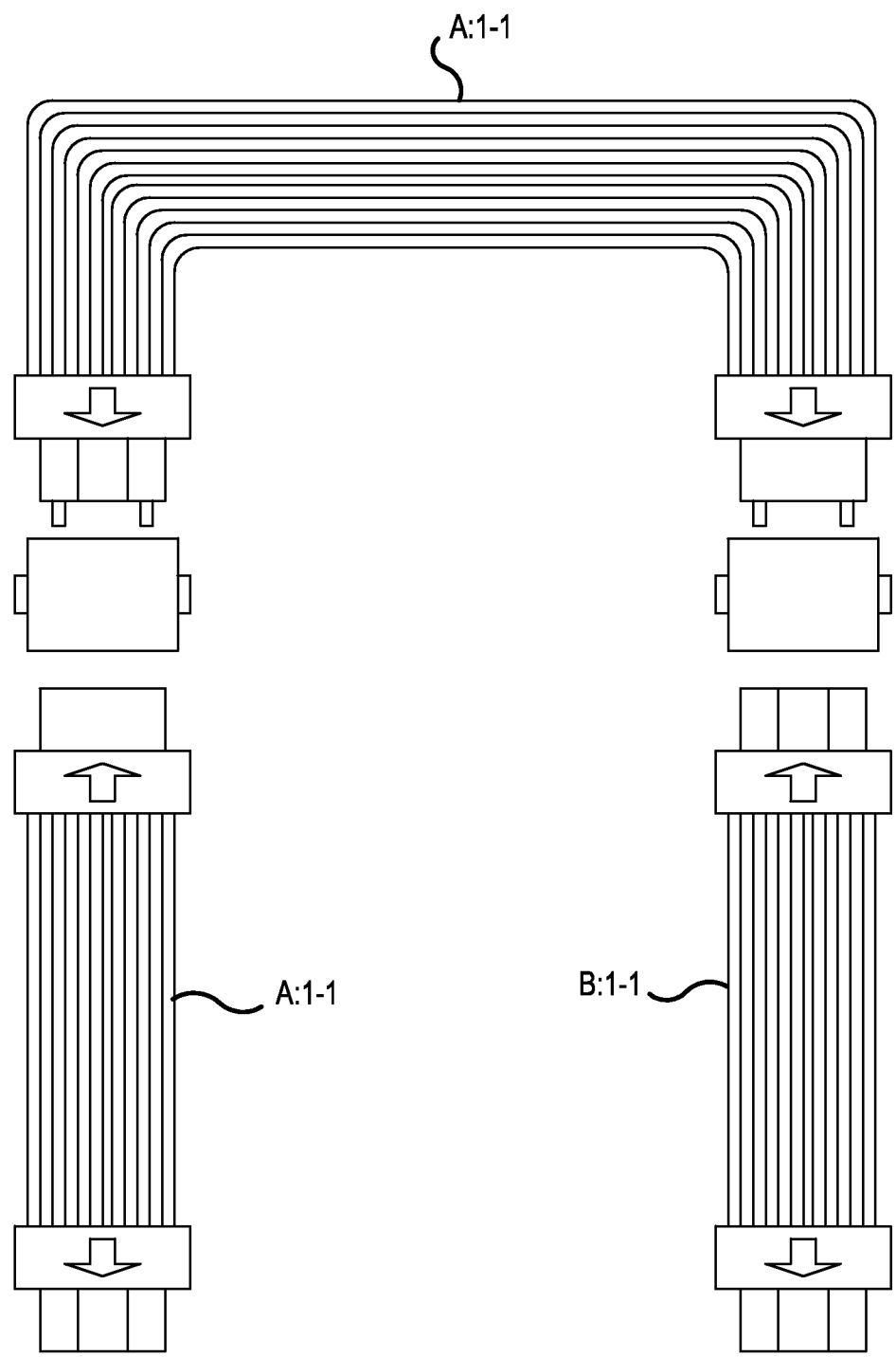
FIGS. 17-25 show the details of the array patch cords, which are labeled Type-A:1-1 (Sometimes referred to as Type-A1), Type-A2, Type-B:1-1 (Sometimes referred to as Type-B1), Type-B2, Type-C:1-1 (Sometimes referred to as Type-C1), and Type-C2 in FIGS. 8-16.
Figure 18:
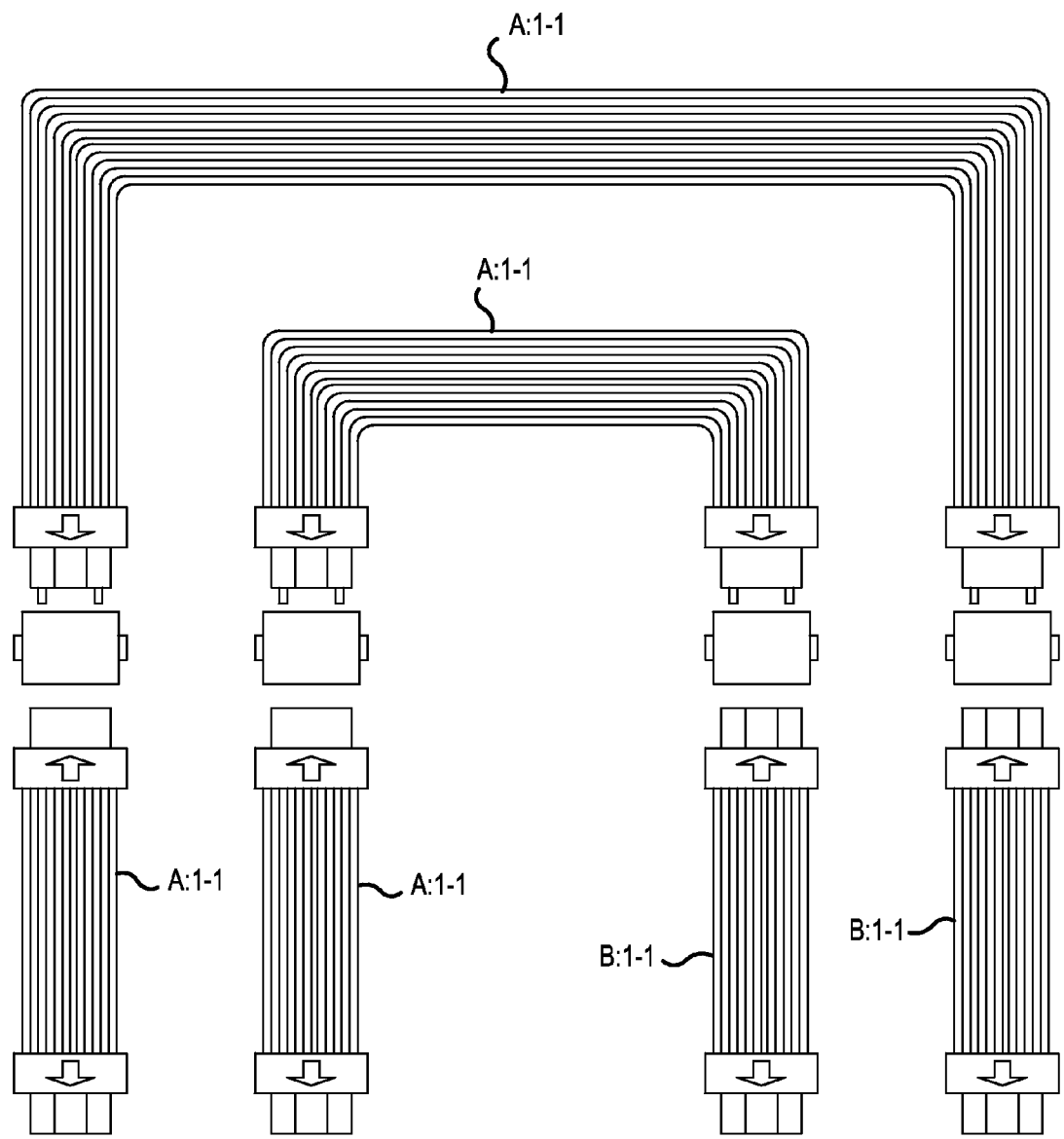
Figure 19:
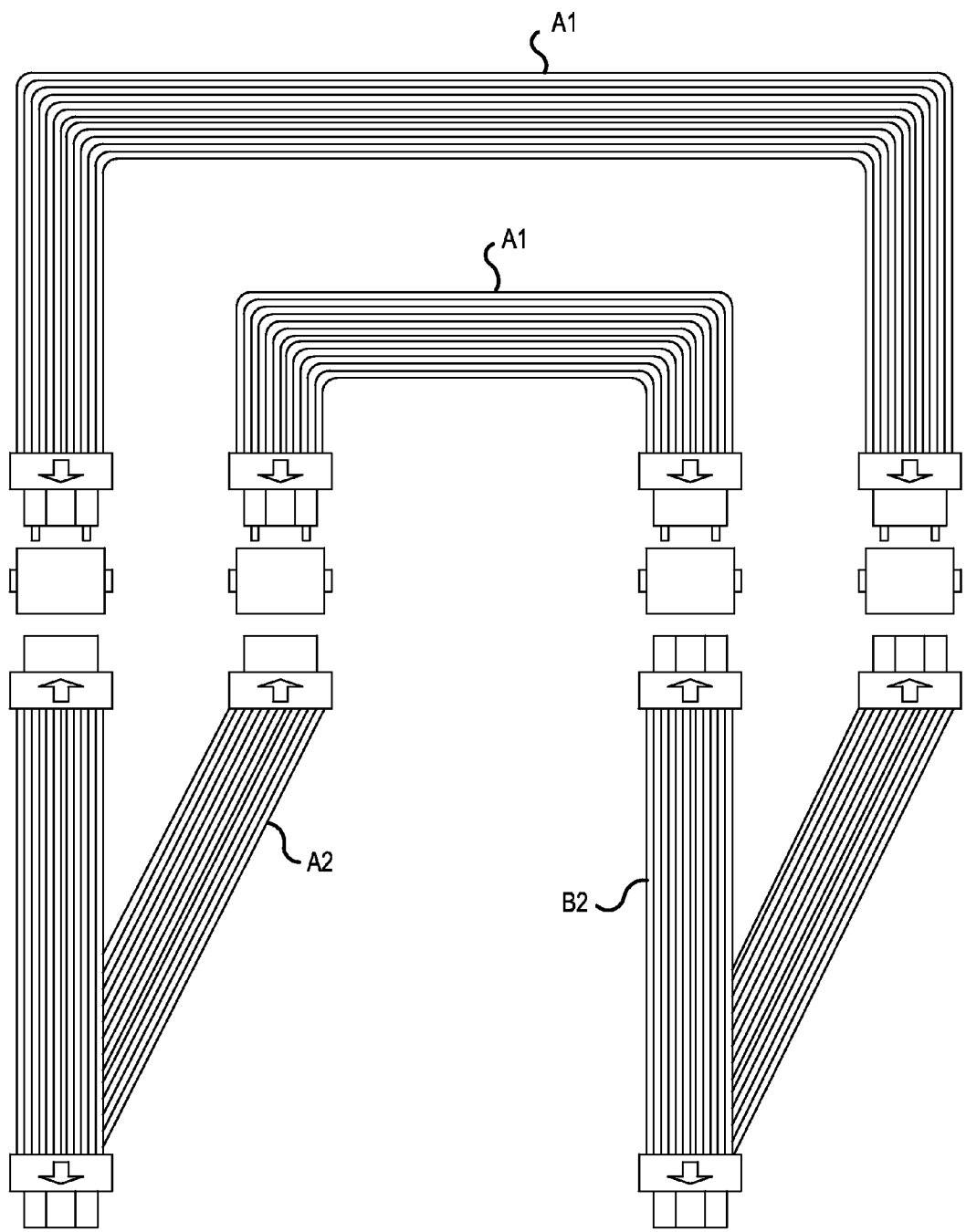
Figure 20:
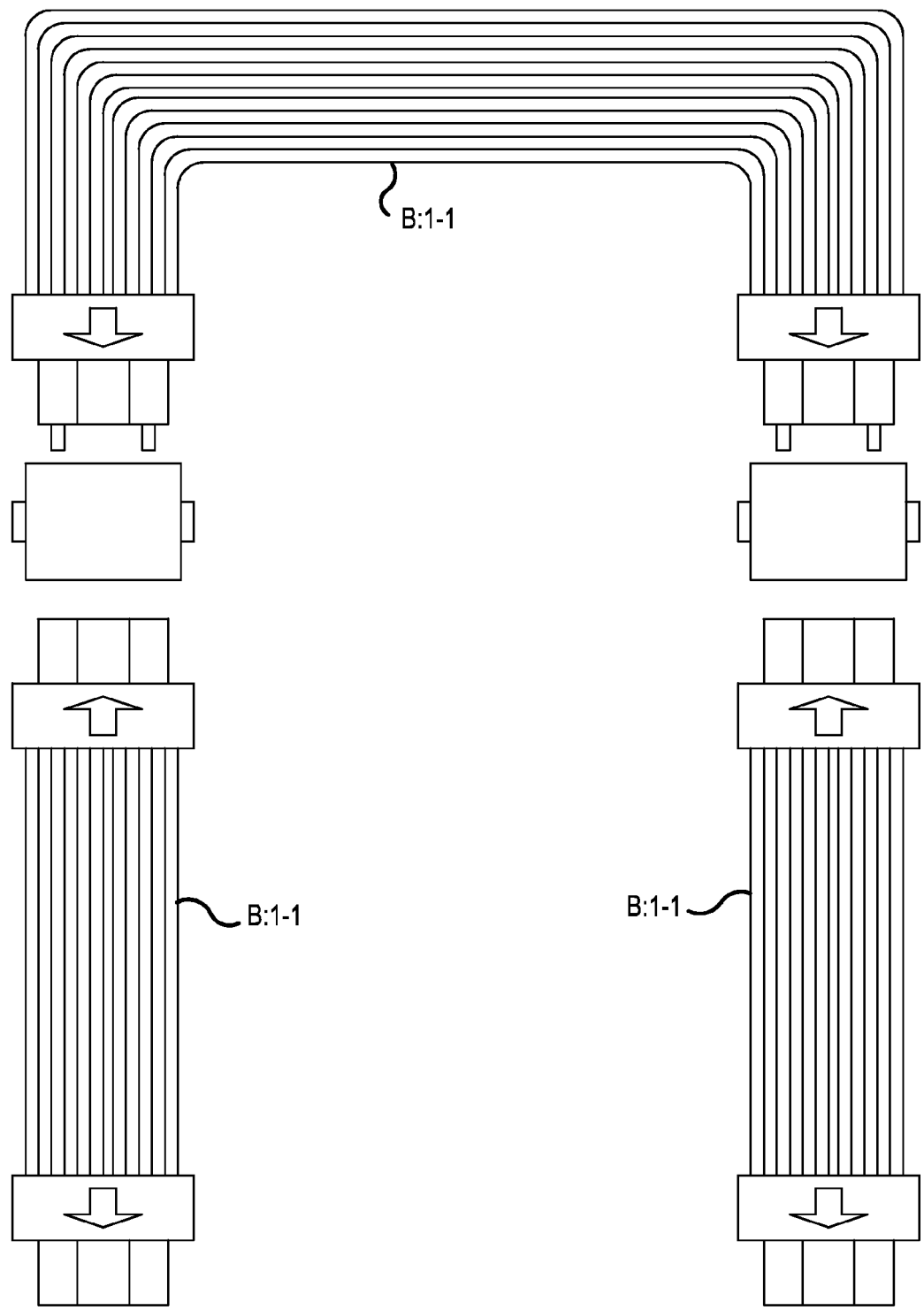
Figure 21:
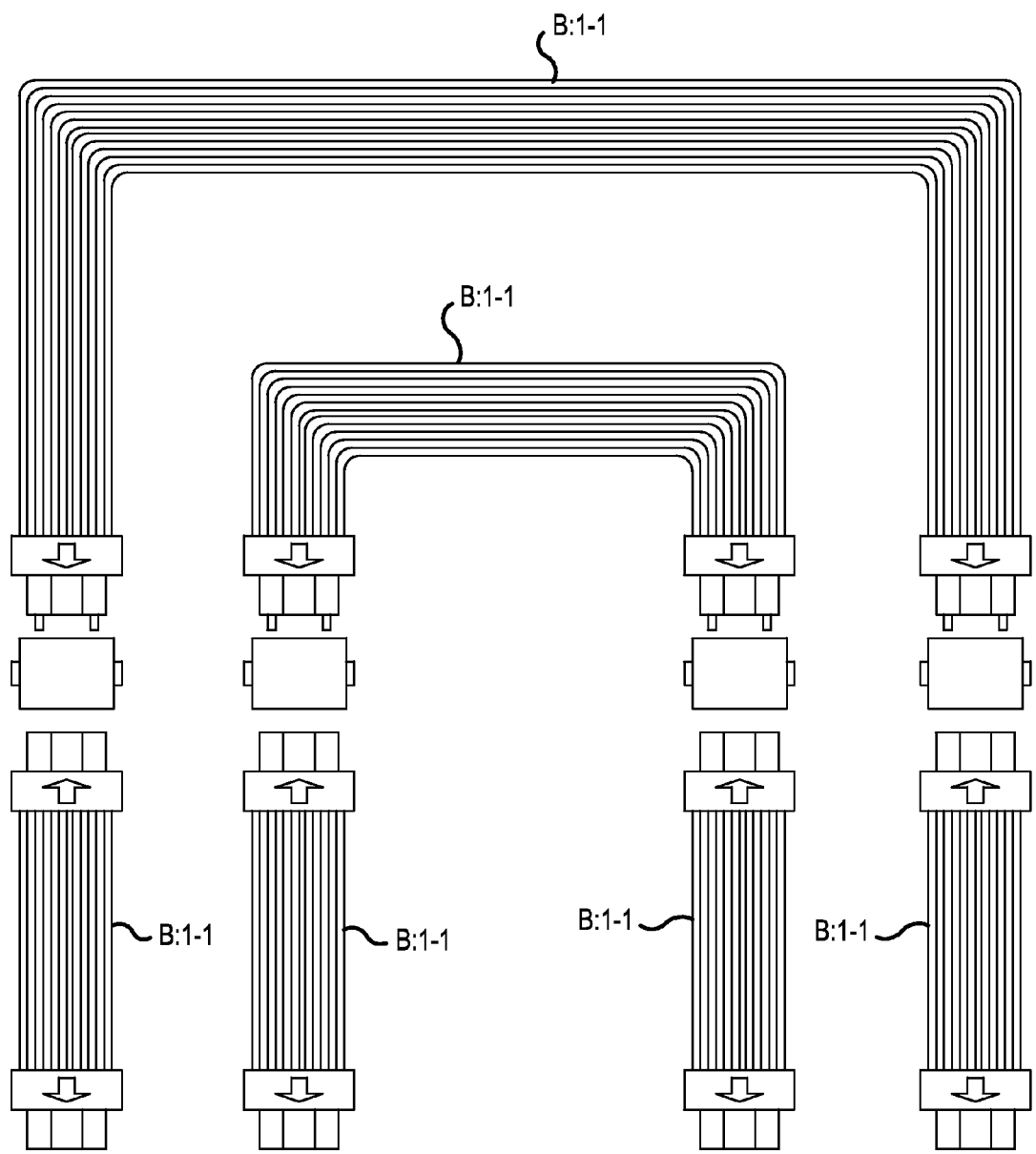
Figure 22:
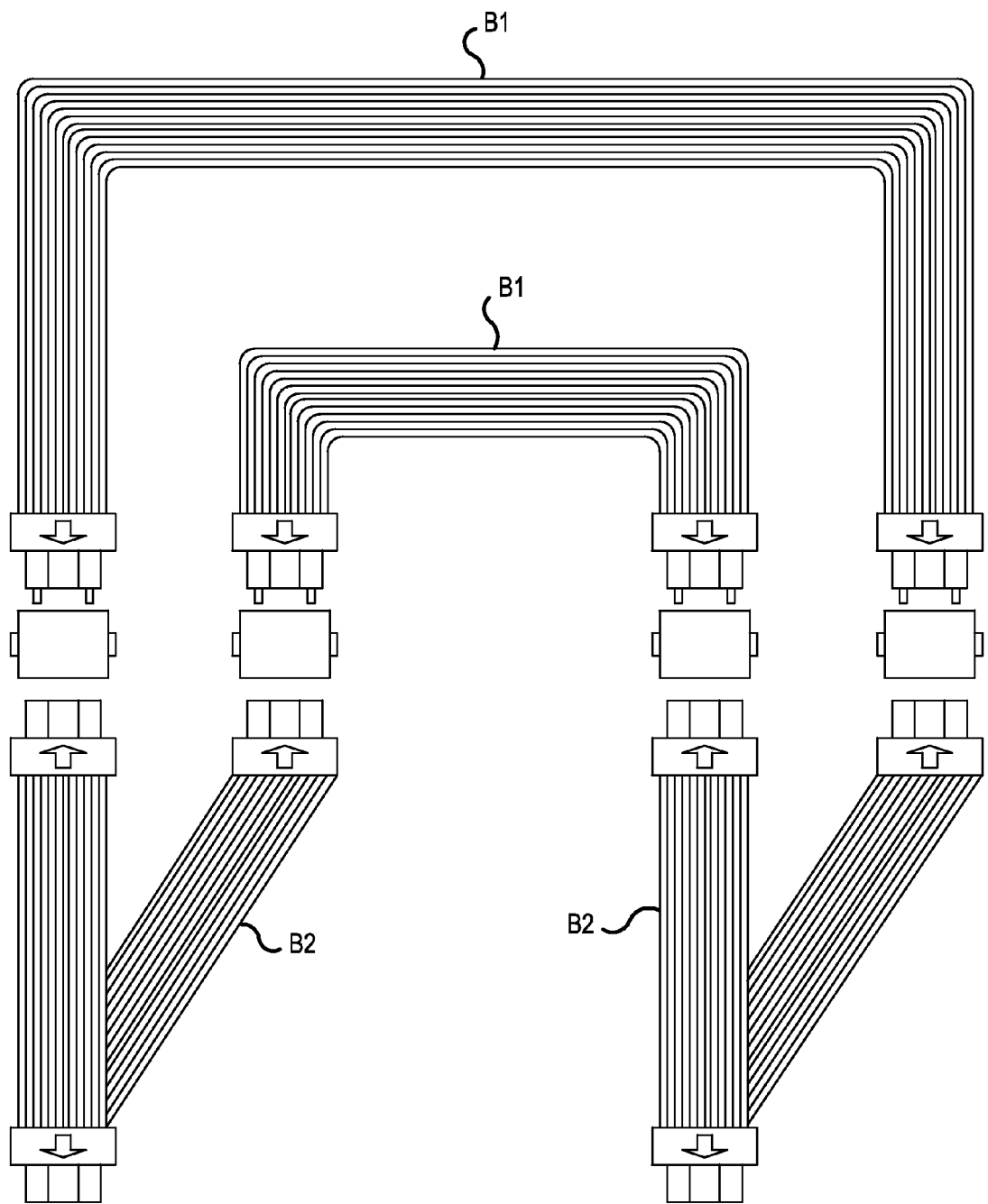
Figure 23:
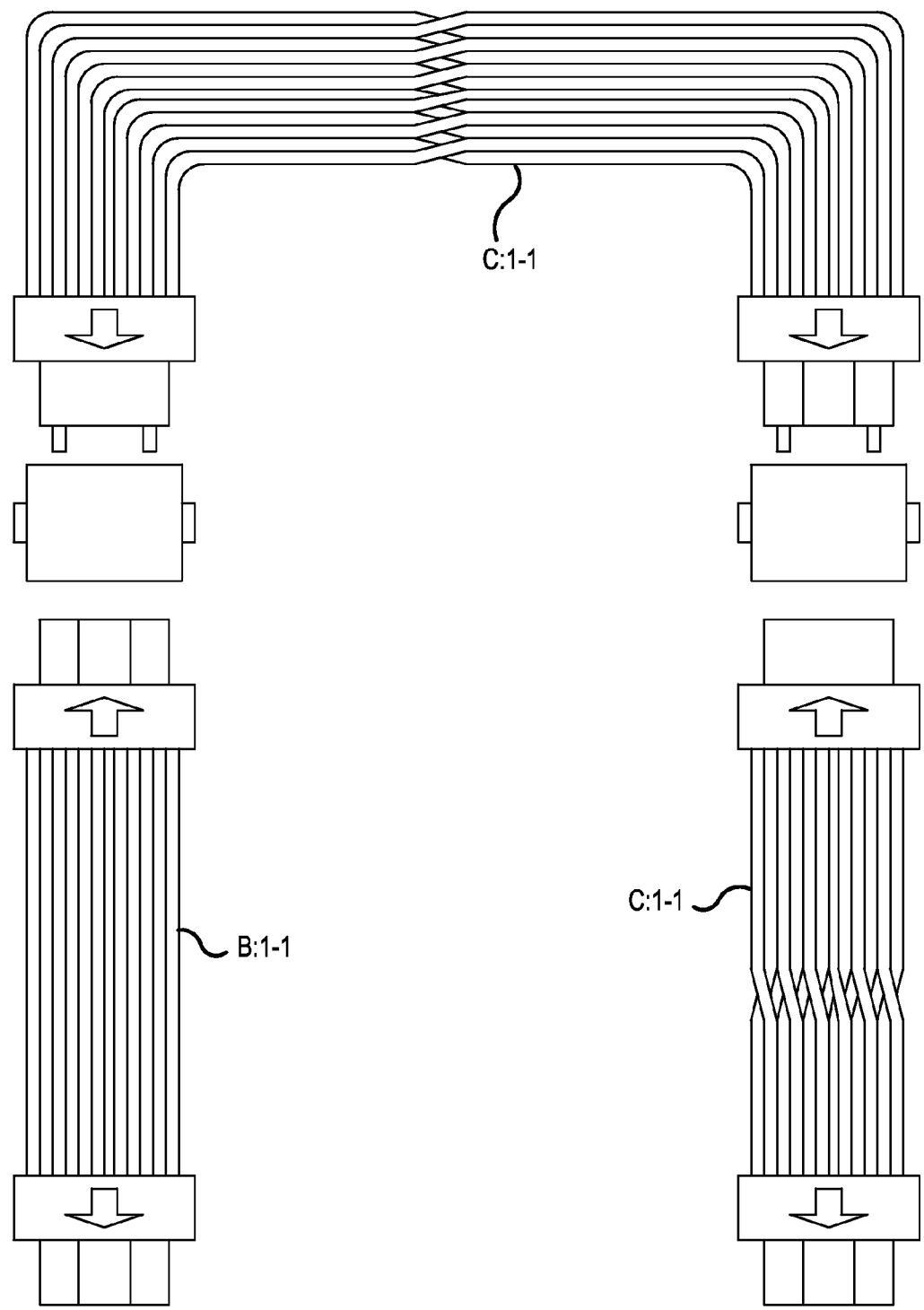
Figure 24:
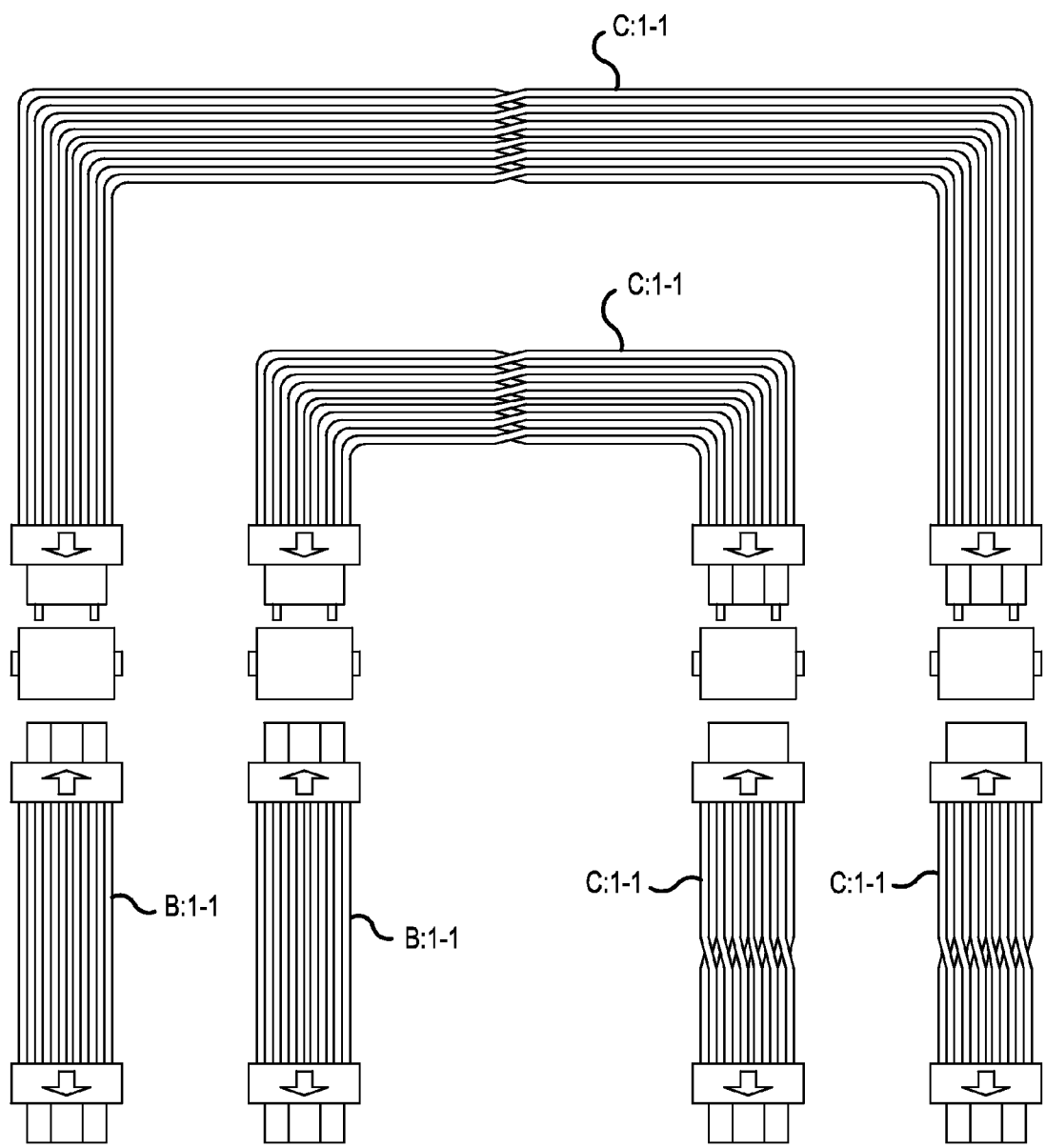
Figure 25:
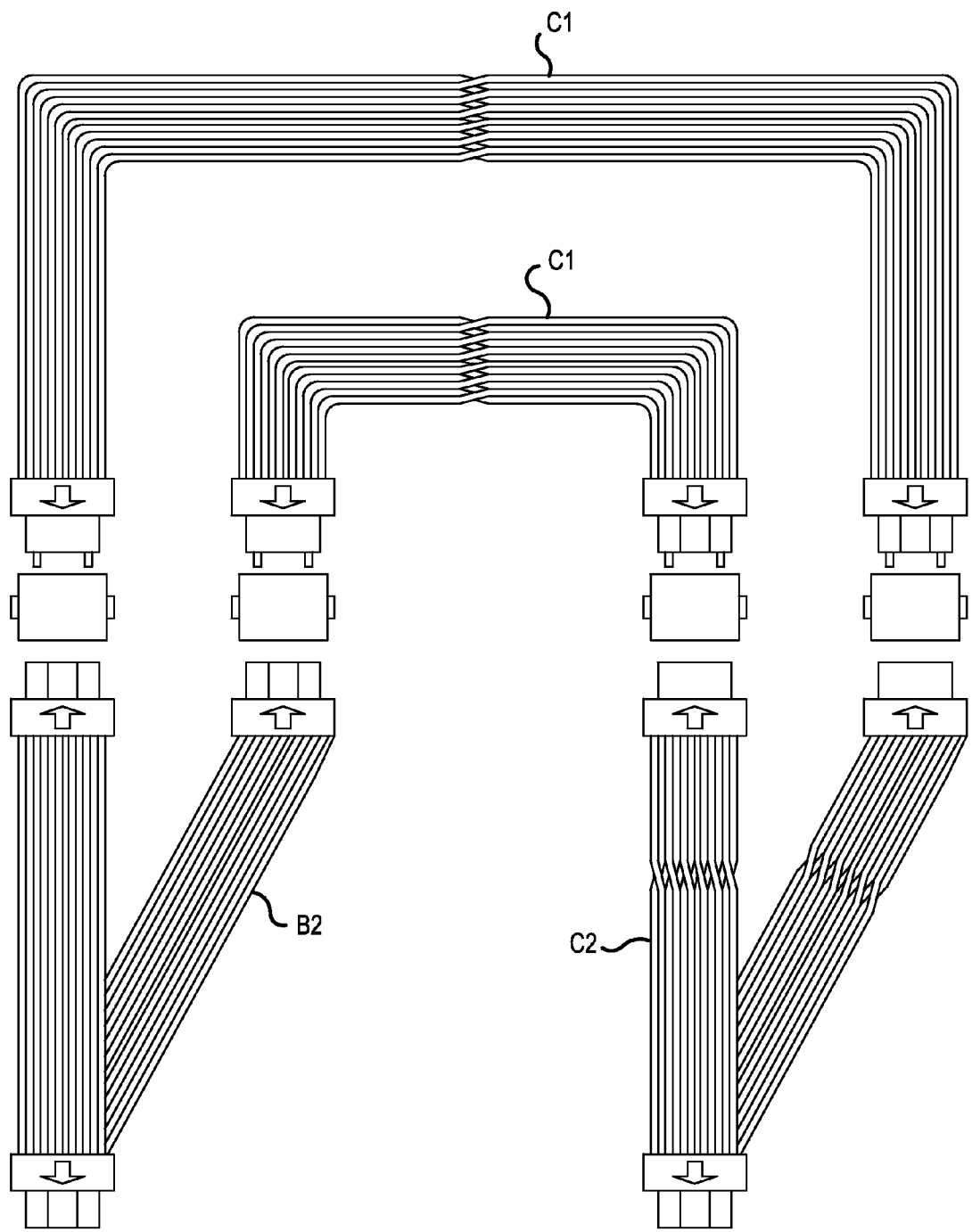

As shown in FIG. 6F, in some embodiments, the connectorized fiber optic cable 500 may comprise a patch cord or jumper cable that includes the length of the cable 202 having a first termination end 501A and a second opposing termination end 501B, and a respective connector assembly 502 installed directly on either or both termination ends 501A, 501B of the cable 202. The optical fibers 204-215 extend from the termination end 501A to the termination end 501B. The strength members 216 may be crimped or otherwise secured directly to both connector assemblies 502 and may extend continuously from one connector assembly 502 to the other and provide strain relief at both connector assemblies 502.

While a single layer ribbonized fiber section is illustrated in FIGS. 4A-4C and 6A-6F, in other embodiments the ribbonized section may include multiple, stacked rows of optical fibers in side-by-side alignment, such as two stacked arrays of multi-core fibers or three stacked arrays of multi-core fibers.

It will be appreciated that the techniques disclosed herein may be performed on any fiber optic cable that includes at least one multi-core optical fiber including, for example, simplex, duplex and multi-fiber optic cables. The fiber optic cable may be, for example, a fiber optic patch cord, jumper cable, horizontal cable, fanout cable, trunk cable or the like. The embodiments of FIGS. 4A-4C and 6A-6F depicted an MPO/MTP type connector and the embodiment of FIGS. 3A-3C depicted a duplex LC type connector, however, the principals of the invention apply equally to other types of connectors in duplex and simplex patch cord arrangements.

While embodiments of the present invention have been described above where the satellite cores are rotationally clocked to a same angular degree in a predictable direction on either end of a fiber optic cable in order to maintain an angular position, it will be appreciated that in other embodiments the satellite cores may be intentionally clocked to different angular positions at one end of a fiber optic cable as compared to the opposite end of the fiber optic cable. For example, one end of the multi-core optical fiber may be rotated one hundred eighty degrees to form a cross connect. One reason for such an arrangement could be security measures. In other words, the patch cord could have a specific clocking of the satellite cores to prevent the patch cord from mating the satellite cores into communication with satellite cores in a port or adapter, where the port or adapter is connected to a secure network or equipment.

Some polarity methods mate MPO patch cords using connectors mating into "key up" to "key down" adapters, and "key up" to "key up" adapters in various combinations, the patch cords can be referenced as type A, B or C. IEEE 802.3ba, published in 2010, defined 40 Gb/s and 100 Gb/s Ethernet on OM3 and OM4 cabling using parallel fibers, specifying one multimode interface for 40GE and three for 100GE. ANSI/TIA-568-C defines three standard methods for structured cabling (A, B and C).

In accordance with the present invention, multi-core fiber (MCF) can be addressed for all of these methods A, B and C. FIGS. 7-16 demonstrate a 1×n MCF, e.g., six satellite cores around one center core. FIGS. 7-16 show how to handle polarity, and expected arrangements of the satellite cores at adapters and the equipment ends. The center core is not shown in FIGS. 7-16 to simplify the figures, since tracking management of the center core is not an issue. The tracking of the satellite cores is illustrated at each end of the connector at each juncture, e.g., adapter or equipment port. In accordance with the preferred embodiments of the previous disclosure, the satellite cores would be indexed to a feature of the connector, e.g., an indexing feature of the ferrule or ferrule holder or connector envelope.

As noted in FIGS. 8-16, the array patch cords are labeled Type-A:1-1 (Sometimes referred to as Type-A1), Type-A2, Type-B:1-1 (Sometimes referred to as Type-B1), Type-B2, Type-C:1-1 (Sometimes referred to as Type-C1), and Type-C2. Because the details of the array patch cords may not be clear in FIGS. 8-16, the array patch cords alone are illustrated in FIGS. 17-25. Of particular note in the figures is the side-by-side pair crossover in the "C" type array patch cords. For example, the optical fiber at port 1 switches position with the optical fiber at port 2, the optical fiber at port 3 switches position with the optical fiber at port 4, and so on. Although the figures depict the crossover as occurring in the middle of the patch cable, the crossover, most likely occurs within one of the connectors at an end of the patch cord.

By the methods depicts in FIGS. 7-25, one can track the clocking of each satellite fiber in each connector to ensure that a launched signal lands on the correct fiber core or detector after traveling though multiple adapters and cable patch cords.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Like numbers refer to like elements throughout. As used herein the term "and/or" includes any and all combinations of one or more of the associated listed items.

Unless otherwise defined, all terms (including technical and scientific terms) used herein have the same meaning as commonly understood by one of ordinary skill in the art to That which is claimed is:

1. A method of attaching connectors to ends of a fiber optic cable possessing at least one multi-core optical fiber, the method comprising:
   inserting a first end of a first multi-core optical fiber of the fiber optic cable into a first ferrule of a first connector;
   rotating the first end of the first multi-core optical fiber within the first ferrule until a first selected core of the first multi-core fiber is in a first alignment relative to a first feature of the first connector;
   affixing the first multi-core optical fiber within the first ferrule of the first connector in the first aligned position;
   inserting a second end of the first multi-core optical fiber of the fiber optic cable into a second ferrule of a second connector;
   rotating the second end of the first multi-core optical fiber within the second ferrule until the first selected core of the first multi-core fiber is in a second alignment relative to a second feature of the second connector; and
   affixing the first multi-core optical fiber within the second ferrule of the second connector in the second aligned position.

2. The method of claim 1, wherein the first feature of the first connector is formed on the first ferrule and the second feature of the second connector is formed on the second ferrule, and wherein the first and second features are alignment marks, protrusions or recesses formed on or in the first and second ferrules, respectively.

3. The method of claim 2, wherein the first and second ferrules are formed in the same shape, with the first and second alignment features being located in the same relative location on the first and second ferrules, respectively.

4. The method of claim 3, wherein the first and second ferrules are array-type ferrules.

5. The method of claim 1, wherein the first ferrule is cylindrical and the first feature of the first connector is a physical feature or marking on a body of a first ferrule holder holding the first ferrule, and wherein the second ferrule is cylindrical and the second feature of the second connector is a physical feature or marking on a body of a second ferrule holder holding the second ferrule.

6. The method of claim 1, wherein the first alignment is defined as a number of degrees that a first line, which passes through a center of the first selected core and a center of a central core of the first multi-core optical fiber, lies above or below a second line, which passes through the center of the central core of the first multi-core optical fiber and the first feature of the first connector.

7. The method of claim 1, wherein the first and second connectors are formed alike with the first and second alignment features being located in the same relative location on the first and second connectors, respectively, and wherein the first alignment relative to the first feature of the first connector is the same as the second alignment relative to the second feature of the second connector.

8. The method of claim 1, wherein the first and second connectors are formed alike with the first and second alignment features being located in the same relative location on the first and second connectors, respectively, and wherein the first alignment relative to the first feature of the first connector is different as compared to the second alignment relative to the second feature of the second connector.

9. The method of claim 1, wherein the at least one multi-core optical fiber includes a second multi-core optical fiber, and further including:
   inserting a first end of the second multi-core optical fiber of the fiber optic cable into the first ferrule of the first connector;
   rotating the first end of the second multi-core optical fiber within the first ferrule until a first selected core of the second multi-core fiber is in a third alignment relative to the first feature of the first connector;
   affixing the second multi-core optical fiber within the first ferrule of the first connector in the third aligned position;
   inserting a second end of the second multi-core optical fiber of the fiber optic cable into the second ferrule of the second connector;
   rotating the second end of the second multi-core optical fiber within the second ferrule until the first selected core of the second multi-core fiber is in a fourth alignment relative to the second feature of the second connector; and
   affixing the second multi-core optical fiber within the second ferrule of the second connector in the fourth aligned position.

10. The method of claim 9, wherein the first alignment relative to the first feature of the first connector is the same as the second alignment relative to the second feature of the second connector, and wherein the third alignment relative to the first feature of the first connector is the same as the fourth alignment relative to the second feature of the second connector, and wherein the first alignment relative to the first feature of the first connector is the same as the third alignment relative to the first feature of the first connector.

11. A method of connectorizing a fiber optic cable that includes a plurality of multi-core optical fibers, the method comprising:
   inserting a first multi-core optical fiber of the plurality of multi-core optical fibers into a ferrule of an optical connector;
   transmitting a light through a first satellite core of the first multi-core optical fiber of the plurality of multi-core optical fibers;
   rotating the first multi-core optical fiber of the plurality of multi-core optical fibers to rotationally align the first satellite core of the first multi-core optical fiber relative to a feature on the optical connector;
   holding the first multi-core optical fiber of the plurality of multi-core optical fibers in a fixed rotational position;
   inserting a second multi-core optical fiber of the plurality of multi-core optical fibers into the ferrule of the optical connector;
   transmitting a light through a first satellite core of the second multi-core optical fiber of the plurality of multi-core optical fibers;
   rotating the second multi-core optical fiber of the plurality of multi-core optical fibers to rotationally align the first satellite core of the second multi-core optical fiber relative to the feature on the optical connector; and
   holding the second multi-core optical fiber of the plurality of multi-core optical fibers in a fixed rotational position.

12. The method of claim 11, further comprising using epoxy to permanently affix the rotationally aligned first and second optical fibers within the ferrule.

13. The method of claim 11, further comprising at least one of:

cleaving and polishing, each end of the plurality of optical fibers extending from an end surface of the ferrule.

14. The method of claim 11, wherein the first and second of the plurality of multi-core optical fibers are each rotationally aligned to a same extent relative to the feature on the optical connector.

15. The method of claim 11, wherein connector is an MPO/MTP type connector and the feature of the optical connector is located on a ferrule of the MPO/MTP connector.

16. An apparatus comprising:
a fiber optic cable possessing at least one multi-core optical fiber;
a first MPO or MTP connector including a first MT type ferrule;
a first end of a first generally round multi-core optical fiber of said fiber optic cable residing in said first ferrule of said first connector, wherein said first end of said first multi-core optical fiber is affixed within said first ferrule in a rotationally oriented manner to have a first selected satellite core of said first multi-core fiber in a first alignment relative to a first feature of said first connector; and
a first end of a second generally round multi-core optical fiber of said fiber optic cable residing in said first ferrule of said first connector, wherein said first end of said second multi-core optical fiber is affixed within said first ferrule in a rotationally oriented manner to have a second selected satellite core of said second multi-core fiber in a second alignment relative to said first feature of said first connector.

17. The apparatus of claim 16, wherein said first feature of said first connector is formed on said first ferrule, and wherein said first feature is an alignment mark, protrusion or recess formed on or in said first ferrule.

18. The apparatus of claim 16, wherein the first alignment relative to said first feature of said first connector is the same as the second alignment relative to said first feature of said first connector.

19. The apparatus of claim 16, further comprising:
a second MPO or MTP connector including a second MT type ferrule;
a second end of said first multi-core optical fiber of said fiber optic cable residing in said second ferrule of said second connector, wherein said second end of said first multi-core optical fiber is affixed within said second ferrule in a rotationally oriented manner to have said first selected satellite core of said first multi-core fiber in a third alignment relative to a second feature of said second connector; and
a second end of said second multi-core optical fiber of said fiber optic cable residing in said second ferrule of said second connector, wherein said second end of said second multi-core optical fiber is affixed within said second ferrule in a rotationally oriented manner to have said second selected satellite core of said second multi-core fiber in a fourth alignment relative to said second feature of said second connector.

20. The apparatus of claim 19, wherein said first and second ferrules are formed in the same shape with said first and second alignment features being located in the same relative location on said first and second ferrules, respectively, and wherein the first alignment of said first selected satellite core of said first multi-core fiber relative to said first feature of said first connector is the same as the second alignment of said first selected satellite core of said first multi-core fiber relative to said second feature of said second connector.

* * * * *